(12) United States Patent
Klein et al.

(10) Patent No.: US 10,976,160 B2
(45) Date of Patent: Apr. 13, 2021

(54) FENESTRATION INSTALLATION DIAGNOSTIC SYSTEM

(71) Applicant: Marvin Lumber and Cedar Company, Warroad, MN (US)

(72) Inventors: Eric John Klein, Roseau, MN (US); Kyle Huston, Warroad, MN (US)

(73) Assignee: Marvin Lumber and Cedar Company, LLC, Warroad, MN (US)

( * ) Notice: Subject to any disclaimer, the term of this patent is extended or adjusted under 35 U.S.C. 154(b) by 236 days.

(21) Appl. No.: 16/057,379

(22) Filed: Aug. 7, 2018

(65) Prior Publication Data

US 2019/0041208 A1    Feb. 7, 2019

Related U.S. Application Data

(60) Provisional application No. 62/542,060, filed on Aug. 7, 2017.

(51) Int. Cl.
| | |
|---|---|
| *G01C 15/10* | (2006.01) |
| *G01C 15/12* | (2006.01) |
| *E06B 1/60* | (2006.01) |
| *E06B 1/36* | (2006.01) |

(52) U.S. Cl.
CPC ............. *G01C 15/10* (2013.01); *E06B 1/36* (2013.01); *E06B 1/60* (2013.01); *G01C 15/12* (2013.01)

(58) Field of Classification Search
CPC . G01C 9/28; G01C 25/00; G01C 9/00; G01C 9/26; G01C 9/24; G01C 9/32; G01C 9/34; G01C 9/36; G01C 15/004; G01C 15/12; G01C 15/002; G01C 15/06; G01C 15/105; G01C 1/00; G01C 1/02

USPC ................................................... 33/194, 392
See application file for complete search history.

(56) References Cited

U.S. PATENT DOCUMENTS

| | | | | |
|---|---|---|---|---|
| 1,946,961 | A * | 2/1934 | Blade ............... | E04F 21/0015 33/194 |
| 5,167,073 | A * | 12/1992 | Stein ................ | E04F 21/003 269/905 |
| 6,021,578 | A * | 2/2000 | DeVingo ........... | G01C 15/10 33/371 |
| 6,282,852 | B1 * | 9/2001 | Walcker ............. | E04F 21/003 144/144.51 |
| 6,418,631 | B1 * | 7/2002 | Ramsthaler ........ | B43K 23/00 33/41.4 |

(Continued)

*Primary Examiner* — Yaritza Guadalupe-McCall
(74) *Attorney, Agent, or Firm* — Schwegman Lundberg & Woessner, P.A.

(57) ABSTRACT

A fenestration installation diagnostic system includes a diagnostic cord and a plurality of diagnostic fittings configured for coupling with a fenestration assembly. Each of the diagnostic fittings includes at least one bracket leg configured to statically couple the diagnostic fitting with the fenestration assembly and at least one alignment interface, and the alignment interface is configured to align the diagnostic cord at a diagnostic intersection. Each of the diagnostic fittings further includes at least one cord guide configured to route the diagnostic cord along the diagnostic fitting and toward another diagnostic fitting of the plurality of diagnostic fittings. In a diagnostic configuration with the fenestration assembly each of the diagnostic fittings are statically with the fenestration assembly, and the diagnostic cord tautly extends from the alignment interfaces of the plurality of diagnostic fittings to the diagnostic intersection.

32 Claims, 13 Drawing Sheets

(56) References Cited

U.S. PATENT DOCUMENTS

| | | | | |
|---|---|---|---|---|
| 6,442,853 B1* | 9/2002 | Hale | ............... | G01C 9/28 |
| | | | | 33/194 |
| 6,530,186 B2* | 3/2003 | Torstensen | ............ | E04F 21/003 |
| | | | | 248/354.1 |
| 6,810,592 B1* | 11/2004 | Oldfield, Jr. | ........ | E04F 21/0015 |
| | | | | 33/194 |
| 6,966,119 B1* | 11/2005 | Dlugoleski | ............. | G01C 9/26 |
| | | | | 33/194 |
| 6,990,741 B1* | 1/2006 | Wells | ................. | E04F 21/0015 |
| | | | | 33/194 |
| 7,370,425 B1* | 5/2008 | Gieseke | ............... | E04F 21/003 |
| | | | | 33/27.01 |
| 7,730,622 B2* | 6/2010 | McCauley | ............. | E04F 21/18 |
| | | | | 33/194 |
| 9,091,085 B2* | 7/2015 | Hokanson | ........... | E04F 21/0015 |
| 2002/0069541 A1* | 6/2002 | Sumner | .............. | E04F 21/0015 |
| | | | | 33/194 |
| 2003/0005589 A1* | 1/2003 | Hale | ................. | E04F 21/0015 |
| | | | | 33/194 |
| 2003/0204961 A1* | 11/2003 | Sumner | .............. | E04F 21/0015 |
| | | | | 33/194 |
| 2004/0000061 A1* | 1/2004 | Tuthill | ............... | E04F 21/0015 |
| | | | | 33/194 |
| 2007/0079521 A1* | 4/2007 | Hill | ........................ | G01B 3/08 |
| | | | | 33/809 |
| 2008/0196259 A1* | 8/2008 | Gieseke | ............... | E06B 3/6604 |
| | | | | 33/32.3 |
| 2013/0333296 A1* | 12/2013 | Lyons | ................... | F16M 13/00 |
| | | | | 49/506 |
| 2019/0041208 A1* | 2/2019 | Klein | .................... | G01C 15/10 |

* cited by examiner

FENESTRATION INSTALLATION DIAGNOSTIC SYSTEM

CLAIM OF PRIORITY

This patent application claims the benefit of priority of Klein, et. al. U.S. Provisional Patent Application Ser. No. 62/542,060, entitled "FENESTRATION INSTALLATION DIAGNOSTIC SYSTEM," filed on Aug. 7, 2017, which is hereby incorporated by reference herein in its entirety

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Marvin Lumber and Cedar Company, d/b/a Marvin Windows and Doors; Warroad Minn., USA. All Rights Reserved.

TECHNICAL FIELD

This document pertains generally, but not by way of limitation, to fenestration assemblies and installation of the same.

BACKGROUND

The installation of a fenestration assembly including a window, door or the like includes the positioning of the assembly within a rough opening, for instance in a wall. The frame of the fenestration assembly is installed within the rough opening. The fenestration assembly is then checked for adequate installation characteristics. For instance, the assembly is checked for one or more of level (horizontally level), plumb (vertically level, is the assembly tipped forward or backward in the rough opening), square (each corner is at specified angle, such as 90 degrees) and true (the fenestration assembly's vertical jambs are in the same plane and are not warped on one side relative to the to the other side).

In some examples, the installer uses a variety of tools to check the installation characteristics of the fenestration assembly. For instance, a level is used to assess the level and plumb characteristics of the assembly. A square (framing square) is optionally used to assess whether the fenestration assembly is square. Alternatively, diagonal measurements are made between opposed corners of the fenestration assembly (e.g., right upper and left lower, and right lower and left upper corners). If the diagonal measurements match then the assembly is square. For assessing if the fenestration assembly is true the installer, in some examples, tacks nails at the corners of the fenestration assembly and ties off a string between each of the opposed corners. If the strings at their intersection do not touch each other or if they do touch one of the strings folds around the other string, then the assembly is not true. If the strings touch without folding then the assembly is true.

Overview

The present inventors have recognized, among other things, that a problem to be solved can include minimizing time and effort in assessing installation characteristics with fenestration assemblies. In some examples, the installer uses a variety of tools including, but not limited to, a level, tape measure, square, fasteners and cords, or the like to assess each of the installation characteristics of a fenestration assembly. For instance, each of plumb, square, level and true use different tools and accordingly increase labor and time to diagnose a fenestration assembly. In one example, a level is used on each of the header and sill to check the level and plumb of the fenestration assembly. In another example, a measuring tape is used to measure the diagonals of a fenestration assembly (e.g., from upper right corner to lower left corner and upper left corner to lower right corner) to determine if the assembly is square. In still another example, tacks are nailed into the fenestration frame and string is stretched between the tacks to form an intersection near the middle of the fenestration assembly. If there is a gap between the intersecting string or the string is binding (e.g., folding at the intersection over the other length of string) the fenestration assembly is not true.

The present subject matter can help provide a solution to this problem with an installation diagnostic system that is readily installed, used for diagnosis of the installation and then easily removed from the fenestration assembly. The system includes a plurality of diagnostic fittings configured for static coupling at locations along the fenestration assembly. For instance, the diagnostic fittings include one or more bracket legs that engage with the fenestration frame and lock the fittings in place on the frame (e.g., at corners, between corners or the like). A diagnostic cord (such as a wire, cable, ribbon, filament, string, twine or the like) is then routed between the fittings to form a diagnostic intersection. The diagnostic cord is held taut by the diagnostic fittings and provides a clear, well defined and accurate diagnostic intersection because of the static coupling of the fittings at specified locations and one or more alignment interfaces provided on the fittings to position and align the diagnostic cord.

The diagnostic system is used to assess each of plumb, square, level and true of the fenestration assembly quickly, without the need for other tools (such as levels, squares or the like) or the skilled use of those tools. For instance, the fenestration assembly is assessed as true if there is no gap between the lengths of the diagnostic cord at the diagnostic intersection and if there is no engagement and folding of the diagnostic cords at the diagnostic intersection. In another example, the fenestration assembly is assessed as plumb if there is no depth gap between a plumb length of the diagnostic cord (e.g., suspended from a diagnostic fitting above the diagnostic intersection) and the lengths of the diagnostic cord at the diagnostic intersection and if there is no engagement and folding of the plumb length at the diagnostic intersection. In yet another example, the fenestration assembly is assessed as square and level if the plumb length is aligned with the lengths of the diagnostic cord at the diagnostic intersection (e.g., without lateral space therebetween).

This overview is intended to provide an overview of subject matter of the present patent application. It is not intended to provide an exclusive or exhaustive explanation of the disclosure. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
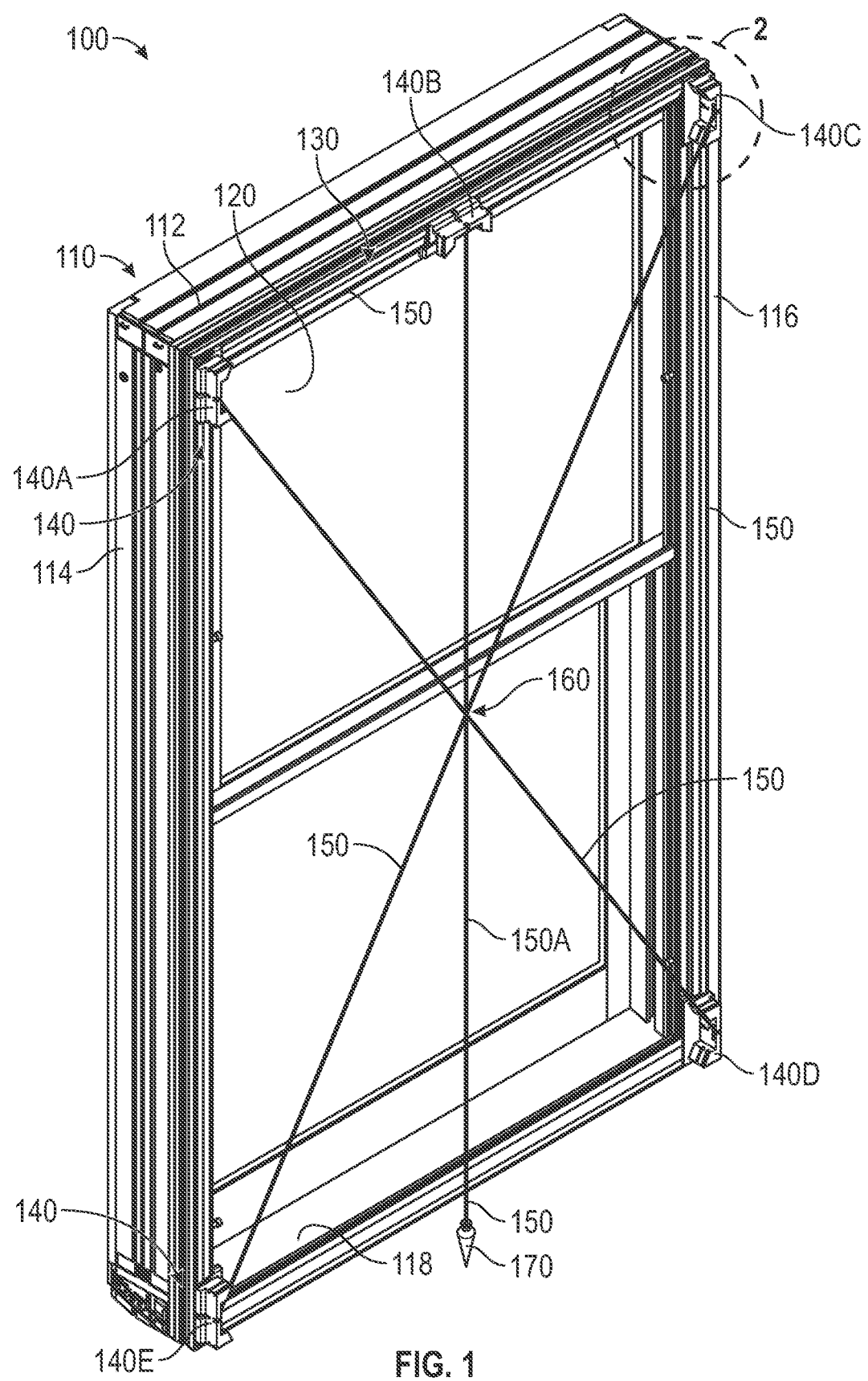
FIG. 1 is a perspective view of a fenestration assembly and a diagnostic system for installing the fenestration assembly.

FIG. 1 is a perspective view of a fenestration assembly 100 and an installation diagnostic system 130 to assess various characteristics of the fenestration assembly 100. The fenestration assembly 100 includes a fenestration frame 110 and at least one panel 120 (e.g., a door, a sash, or the like). The fenestration frame 110 is configured for installation within structures, including (but not limited to) a shed, a barn, a single-family residence, a multi-family residence, a municipal building, an office building, a warehouse, or the like. In an example, the fenestration assembly 100 includes at least one of a casement window, single hung window, double hung window, awning window, sliding window or the like coupled with a wall of a residence. As shown, the fenestration frame 110 includes a header 112, a first jamb 114, a second jamb 116, and a sill 118.

The one or more panels 120 optionally include a pane of glass, and in some examples, the panel 120 is configured to slide relative to the fenestration frame 110. In another example, the panel 120 is rotatable relative to the fenestration frame 110 (e.g., the panel 120 may rotate between an open position and a closed position, for instance as a casement window, awning window or the like).

The fenestration assembly 100, for instance the fenestration frame 110 is installed within a structure. When the fenestration frame 110 is coupled with the structure, users of the fenestration assembly 100 expect that the fenestration assembly 100 is oriented (e.g., positioned, arranged, installed or the like) in the structure according to threshold installation characteristics. For instance, the fenestration assembly 100, when properly installed, is one or more of: level (horizontally level), plumb (vertically level; the assembly is not tipped forward or backward in the rough opening), square (each corner spans a specified angle, such as 90 degrees) and true (the fenestration assembly's vertical jambs are in the same plane and are not warped on one side relative to the to the other side). The installer adjusts the fenestration assembly 100 to orient it within the structure (a rough opening of the structure) while achieving these threshold installation characteristics (one or more of level, plumb, square and true within code accepted tolerances).

The diagnostic system 130 described herein assesses the installation of the fenestration assembly 100 within a structure. In one example, the diagnostic system 130 assesses whether the fenestration assembly 100 is oriented in the structure according to the threshold installation characteristics. As shown in FIG. 1, the diagnostic system 130 includes a plurality of diagnostic fittings 140 configured for static coupling at locations along the fenestration assembly 100. In one example, the diagnostic fittings 140, when statically coupled with the assembly 100, have limited, or no, degrees of freedom to move. For example, a first diagnostic fitting 140A, a second diagnostic fitting 140B, a third diagnostic fitting 140C, a fourth diagnostic fitting 140D, and a fifth diagnostic fitting 140E (collectively diagnostic fittings 140) are statically coupled to the fenestration assembly 100 (e.g., coupled at one or more of corners of the fenestration assembly 100, coupled at a midpoint of the fenestration frame 110, at specified locations on the assembly 100 or the like).

The diagnostic system 130 includes a diagnostic cord 150 (e.g., a wire, cable, ribbon, filament, string, twine or the like). The diagnostic cord 150 is optionally routed (e.g., navigated between the plurality of diagnostic fittings 140 to form a diagnostic intersection 160). In an example, the diagnostic cord 150 is held taut by the diagnostic fittings 140 (e.g., an interference fit between the fittings and the cord, posts, grooves or the like). In another example, the diagnostic cord 150 is held taut by a plumb bob 170. In some examples, the plumb length 150A of the diagnostic cord 150 is separate from the remainder of the diagnostic cord 150 (e.g., the plumb length 150A is separate length of diagnostic cord 150, and for instance routed through the second diagnostic fitting 150B, shown in FIG. 1). In some examples, the diagnostic cord 150 and the diagnostic fittings 140 are included in a kit (e.g., a pack, container, or the like).

The diagnostic system 130 includes a diagnostic configuration where each of the diagnostic fittings 140 is statically coupled at respective specified locations along the fenestration assembly. The diagnostic cord 150 is routed between each of the diagnostic fittings, and the diagnostic cord 150 aligned by the diagnostic fittings 140 extends to the diagnostic intersection 160. The routing of the diagnostic cord 150 between the diagnostic fittings 140 provides a clear, well defined and accurate diagnostic intersection 160 because of the static coupling of the diagnostic fittings 140 at specified locations.

As described in greater detail herein, one or more alignment interfaces (e.g., the first alignment interface 200A shown in FIG. 2) are provided on the diagnostic fittings 140 to position and align the diagnostic cord 150 to provide a consistent, reliable routing of the diagnostic cord 150 therebetween. One or more of the position of the diagnostic cord 150 or the configuration of the diagnostic intersection 160, allow a user of the diagnostic system 130 to assess (e.g., observe, analyze, determine or evaluate) the installation characteristics of the fenestrations assembly 100.

Figure 13:
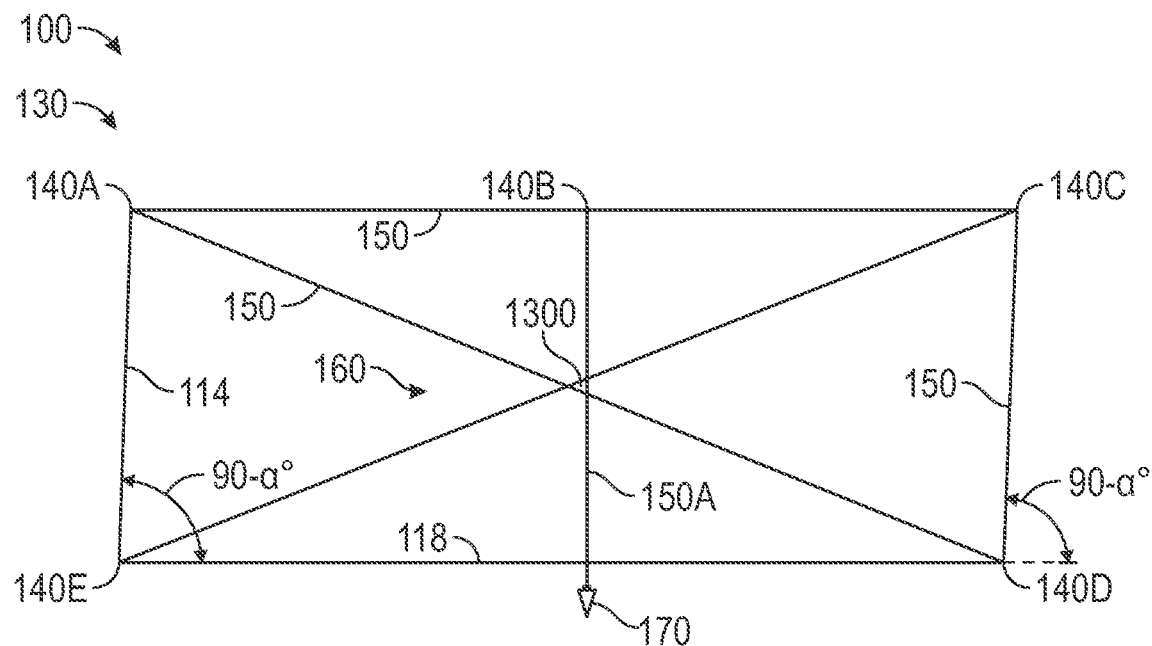
FIG. 13 is a schematic view of the fenestration assembly and the diagnostic system of FIG. 1, where the fenestration assembly is not square, or is not level.
Figure 14:
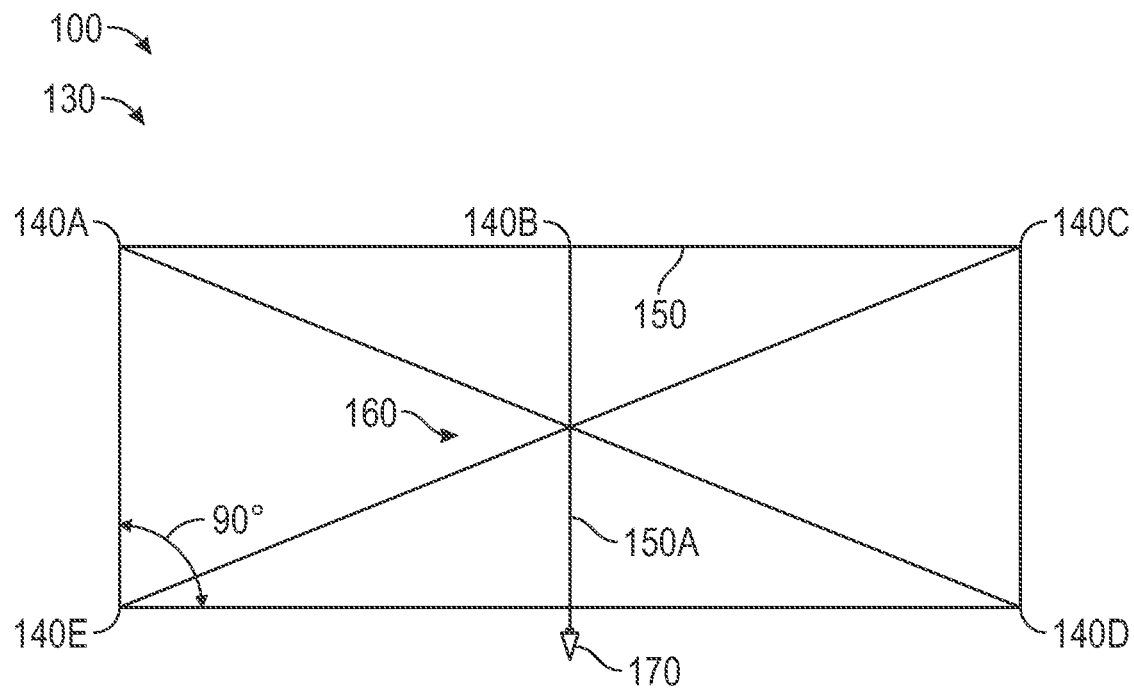
FIG. 14 is a schematic view of the fenestration assembly and the diagnostic system of FIG. 1, where the fenestration assembly is square, or is level.
Figure 17:
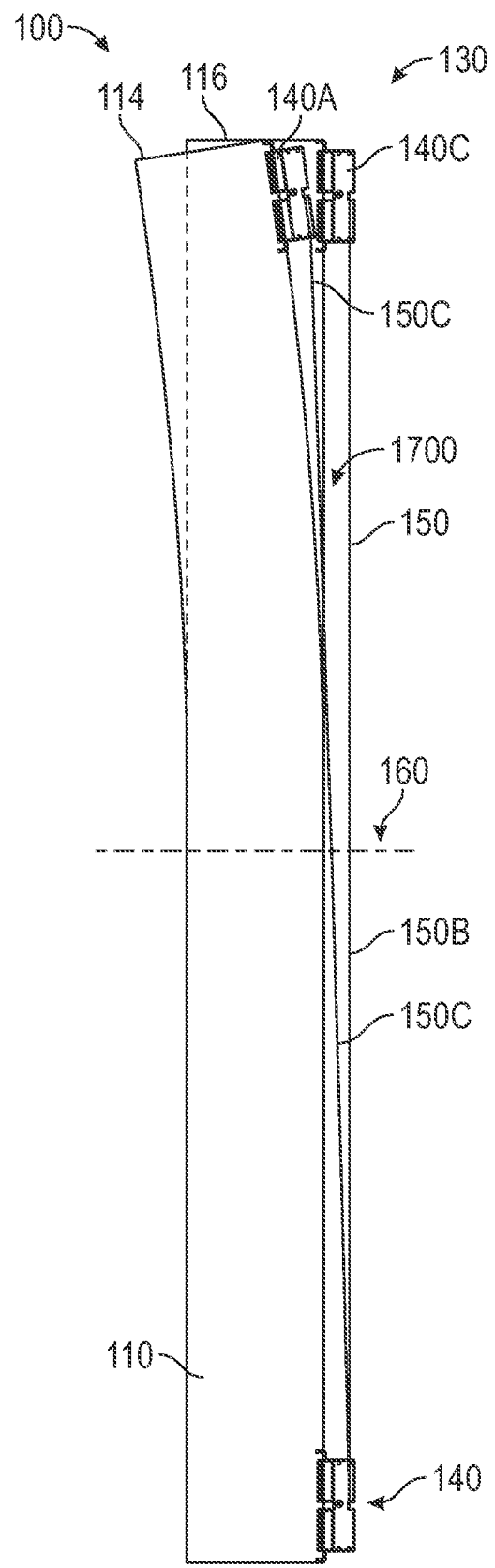
FIG. 17 is a schematic view of the fenestration assembly and the diagnostic system of FIG. 1, where the fenestration assembly is not true, or is twisted.
Figure 18:
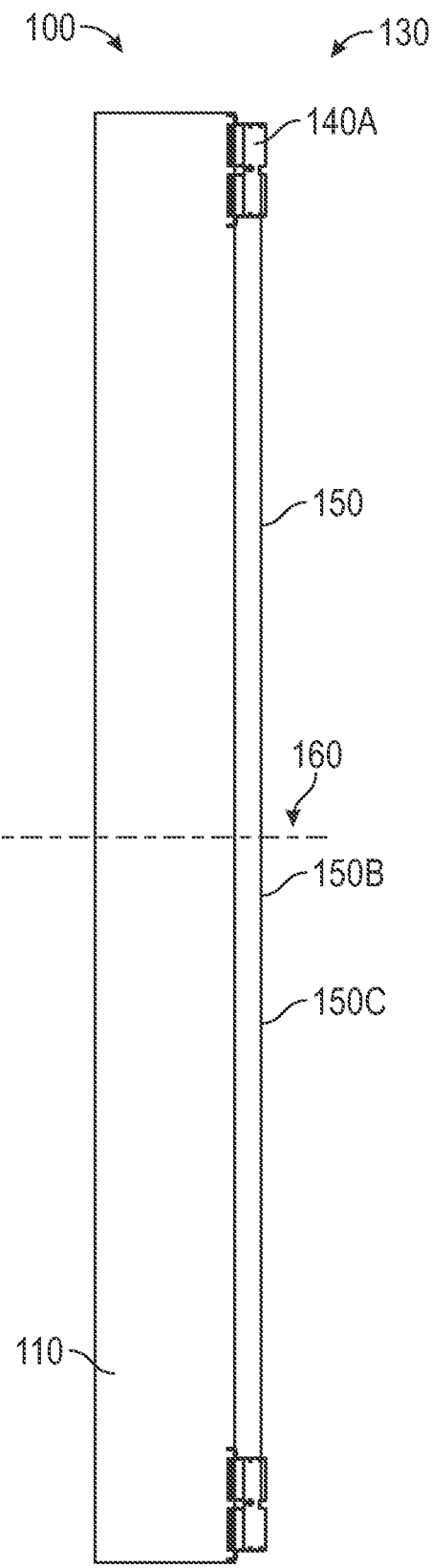
FIG. 18 is a schematic view of the fenestration assembly and the diagnostic system of FIG. 1, where the fenestration assembly is true, or is not twisted.
Figure 19:
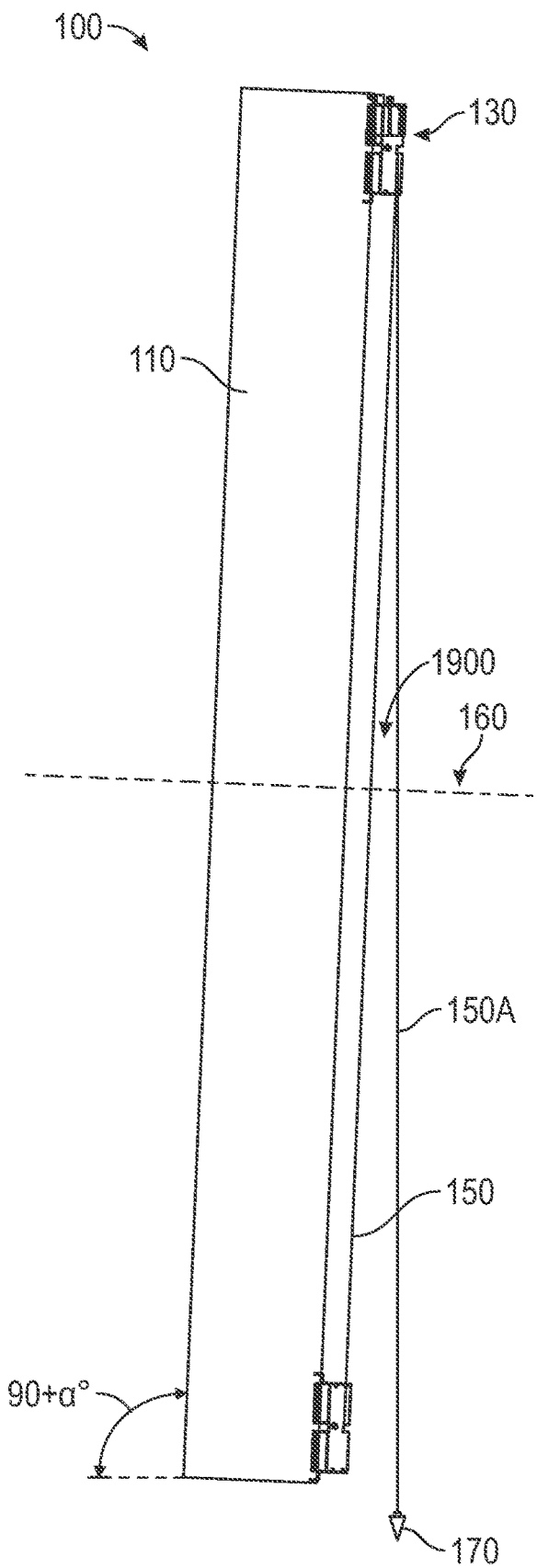
FIG. 19 is a schematic view of the fenestration assembly and the diagnostic system of FIG. 1, where the fenestration assembly is not plumb, or is tilted.

For instance (and as described further herein), the fenestration assembly 100 is assessed as true if the jambs 114, 116 are in the same plane and are not warped on one side relative to the to the other (see FIGS. 17, 18). The diagnostic system 130 assesses the assembly 100 as true if there is no gap between the lengths of the diagnostic cord 150 at the diagnostic intersection 160, and if there is no engagement and folding of the diagnostic cord 150 at the diagnostic intersection 160. These qualities indicate the assembly 100 is true, and accordingly the jambs 114, 116 are in the same plane and not warped. In another example, the diagnostic system 130 assesses the fenestration assembly 100 as plumb (e.g., vertically level; an example assembly that is not plumb is shown in FIG. 19) if there is no depth gap between a plumb length 150A of the diagnostic cord 150 (e.g., extending to the plumb bob 170 in FIG. 1) and the other lengths of the diagnostic cord 150 at the diagnostic intersection 160. If there is a depth gap or folding of the plumb length 150A at the diagnostic intersection 160 the fenestration assembly 100 is not plumb. If the plumb length 150A of the cord 150 is proximate to the intersection (e.g., with minimal or no gap, and the plumb length 150A is not folded over the intersection) the fenestration assembly 100 is plumb. In yet another example, the fenestration assembly 100 is assessed as square and level (e.g., as shown in FIG. 14) if the plumb length 150A is aligned with the other lengths of the diagnostic cord 150 (e.g., extending between the fittings 140) at the diagnostic intersection 160 (e.g., without the lateral space 1300, as shown in FIG. 13).

Figure 2:
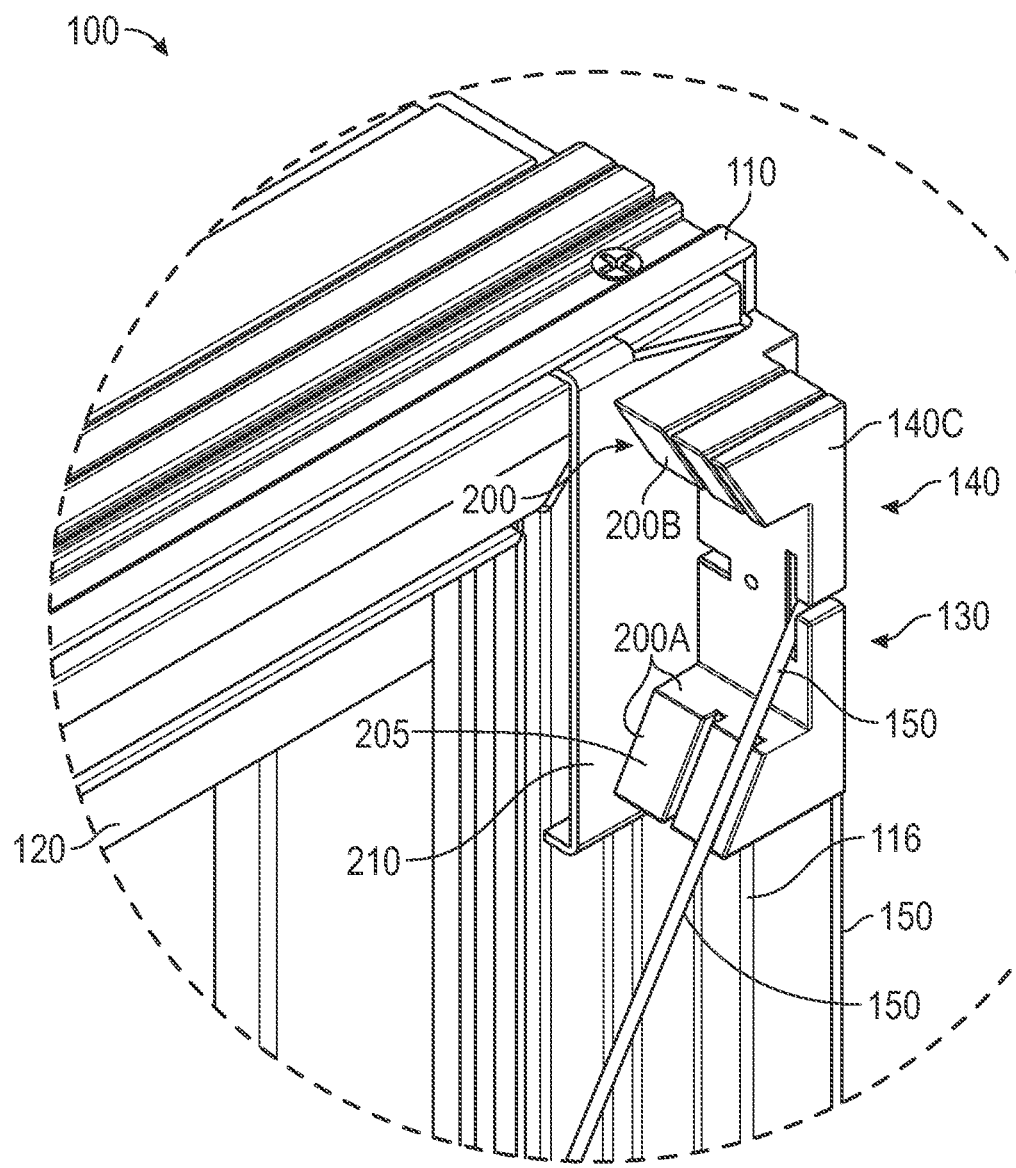
FIG. 2 is a detailed perspective view of a portion of the fenestration assembly of FIG. 1.

FIG. 2 is a detailed perspective view of a portion of the fenestration assembly 100 of FIG. 1. As described herein, the diagnostic system 130 includes a plurality of diagnostic fittings 140, including (but not limited to) the diagnostic fitting 140C. In an example, the diagnostic fitting 140C is statically coupled to the fenestration assembly 100 at a specified location (e.g., along the fenestration frame 110, in a kerf, at a corner, along the jamb 114, 116, the header 110, the sill 112 or the like shown in FIG. 1). The diagnostic cord 150 is routed through the plurality of diagnostic fittings 140. One example of routing of the diagnostic cord 150 through the diagnostic fittings 140 is shown with the diagnostic fitting 140C in FIG. 2.

The plurality of diagnostic fittings 140 optionally include one or more alignment interfaces 200, for example a first alignment interface 200A or a second alignment interface 200B. The one or more alignment interfaces 200 include, but are not limited to, a face, projection, groove, pins, posts or the like that couple with and guide the diagnostic cord 150. For example, the alignment interfaces 200 include one or more of grooves, ridges, a fork having tines or ridges, posts, pins, furrows or the like that receive and guide the diagnostic cord 150.

Optionally, surfaces of the first alignment interface 200 are tapered (e.g., angled with respect to a jamb of the fenestration assembly 100), and the tapered surfaces 205 guide the diagnostic cord 150. For example, and as described herein, in an example the alignment interfaces 200 guide the diagnostic cord 150 toward the diagnostic intersection 160 (shown in FIG. 1). For instance, as shown in FIG. 2, the diagnostic cord 150 is routed across the alignment interface 200 including grooves thereon of the diagnostic fitting 140C. Stated another way, coupling of the diagnostic cord 150 with the one or more alignment interfaces 200 guides (e.g., positions, orients, directs, urges, biases or the like) the diagnostic cord 150 from the diagnostic fittings 140 along a specified path (e.g., from the diagnostic fitting 140C shown in FIG. 2) toward the diagnostic center 160 shown in FIG. 1. In another example, the one or more alignment interfaces 200, such as the alignment interfaces 200B guide the diagnostic cord around a periphery of the fenestration assembly 100, for instance toward other fittings 140.

As described in greater detail herein, the diagnostic system 130 optionally includes a first locking bracket 210 and the diagnostic fitting 140C cooperates with the first locking bracket 210 to couple the diagnostic fitting 140C with the fenestration assembly 100. In one example, the first locking bracket 210 is integral with the diagnostic fitting 140C (e.g., a single piece). In another example, the first locking bracket 210 is separable from the diagnostic fitting 140C (e.g., the bracket 210 is coupled with the fitting 140C). In yet another example, the diagnostic fitting 140C is coupled to the fenestration assembly 100 with a temporary adhesive (e.g., double-sided tape or the like), a fastener, clamps, or corresponding design features included in the fenestration assembly (e.g., the accessory kerf 1000 shown in FIG. 10).

Figure 3:
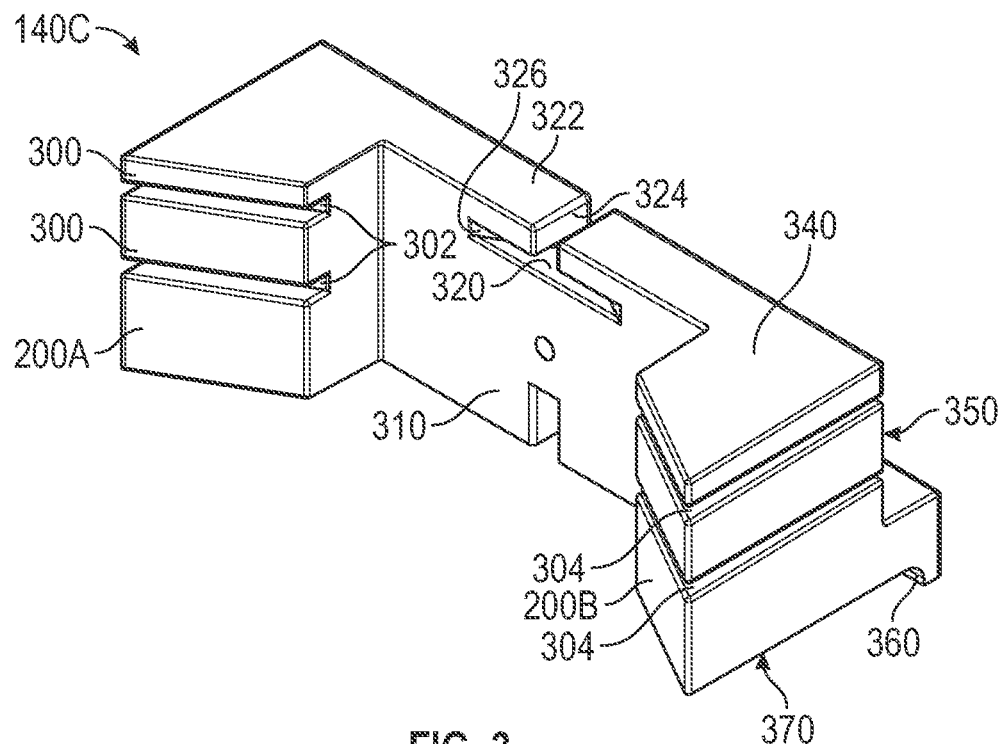
FIG. 3 is a perspective view of one example of a diagnostic fitting.

FIG. 3 is a perspective view of one example of a diagnostic fitting 140, for instance fitting 140C. The diagnostic fitting 140C includes one or more alignment interfaces 200. In this example, the diagnostic fitting 140C includes a first alignment interface 200A and a second alignment interface 200B. The alignment interfaces 200 guide the diagnostic cord 150 (e.g., along a specified path) when the diagnostic cord 150 is routed through the diagnostic fittings 140, such as the fitting 140C. Additionally, the alignment interfaces 200 guide (e.g., direct, position, orient or the like) the diagnostic cord 150 as it extends from the fitting 140C to another of the diagnostic fittings 140. In an example, the first alignment interface 200A extends at a first angle relative to a feature of the fitting 140C, such as a portion of the cord recess 320 (described herein). In another example, the second alignment interface 200A extends at a second angle from the diagnostic fitting 140C.

As described herein, the alignment interfaces 200 optionally include one or more cord guides. For example, the alignment interfaces 200 optionally include one or more of grooves or ridges, a fork having tines or ridges, a post, a groove, a furrow or the like that receive and guide the diagnostic cord 150. In an example, the diagnostic fitting 140C includes an alignment ridge 300 having an alignment recess 302. The alignment recess 302 receives the diagnostic cord 150 (shown in FIGS. 1 and 2) and the alignment recess 302 guides the diagnostic cord 150 (e.g., along a specified path) for instance toward another of the diagnostic fittings 140 and toward the cord recess 320 of the fitting 140C. In an example, the alignment recess 302 guides the diagnostic cord 150 toward the diagnostic intersection 160 (shown in FIG. 1).

The diagnostic fitting 140C optionally includes a cord well 310, and the cord well 310 allows the diagnostic cord 150 to route from a first portion of the diagnostic fitting 140C to a second portion of the diagnostic fitting 140C. For example, the diagnostic fitting 140C includes a cord recess 320, and the cord recess 320 receives the diagnostic cord 150 (shown in FIGS. 1-2). Optionally, the cord recess 320 is positioned between the first alignment interface 200A and the second alignment interface 200B. The cord recess 320 communicates with the cord well 310 and the diagnostic cord 150 is routed through the cord well 310 and extends to the alignment interfaces 200. The cord recess 320 and the alignment recess 302 cooperate to align the diagnostic cord 150 at the diagnostic intersection 160 (shown in FIG. 1). The cord well 310 minimizes binding or misalignment of the diagnostic cord between the cord recess 320 and the alignment recesses 302 on the alignment face 200A (or 200B in another example) by providing an open space in contrast to a continuous or near continuous surface extending from the cord recess 320 to the alignment recesses 302.

In some examples, the cord recess 320 includes a tapered portion 326 that guides (e.g., positions, orients, directs, along a specified path or the like) the diagnostic cord 150. For example, the tapered portion 326 guides the diagnostic cord 150 toward the alignment interfaces 200. The tapered portion 326 is optionally parallel with the alignment recess 302 of the alignment ridge 300 to minimize point loading of the cord 150 from binding, turns or the like.

In some examples, the diagnostic fitting 140C includes a retaining flange 322 configured to retain the diagnostic cord 150 within the cord recess 320. The retaining flange 322 projects from the diagnostic fitting 140C and includes a passageway 324 from an exterior surface 340 of the diagnostic fitting 140C to the cord recess 320. Accordingly, the diagnostic cord 150 is received in the cord recess 320 and retained therein after passing through the passageway 324. In another example, the retaining flange 322 retains (e.g., captures, anchors, positions, holds or the like) the diagnostic cord 150 within the cord recess 320.

The diagnostic fitting 140C optionally includes a delivery interface 350. The delivery interface 350 couples with the diagnostic cord 150 guides the diagnostic cord 150, for instance toward and away from the cord recess 320. In one example, the delivery interface 350 includes a cord guide that the diagnostic cord 150 extends over or through. The delivery interface 350 shown in FIG. 3 is illustrated in FIG. 1 (but not numbered). As shown in FIG. 1, the diagnostic cord 150 engages with the delivery interfaces of one or more of the diagnostic fittings 140. The diagnostic cord 150 extends between the fittings 140 (A, B, C, D and E) and wraps along the respective delivery interfaces each of the fittings. In the example shown in FIG. 1, the diagnostic cord 150 extends between adjacent fittings (e.g., along a common jamb, header, will or the like) to and over each of the delivery interfaces 350 (shown in detail in FIGS. 3 and 4).

In some examples, the cord recess 320 (shown in FIG. 3) communicates with the delivery interface 350, and the diagnostic fitting 140C reroutes the diagnostic cord 350 from the recess 320 across the interface 350, for instance to redirect the cord 150 toward the next fitting 140. In the example shown in FIG. 2, the diagnostic cord 150 is routed in a first direction parallel with the second jamb 116 along the delivery interface 350 (hidden by perspective) and then redirected through the cord recess 320 according to the tapers in the cord recess 320 and along the alignment interfaces (200A in FIG. 2). The positioning of the diagnostic cord 150 in the cord recess 350 while the diagnostic cord 150 is engaged with the delivery interface 350 reroutes (e.g., changes the path or direction) of the diagnostic cord 150. In an example, as shown in FIG. 1, the diagnostic fitting 140C reroutes the diagnostic cord 150 toward the diagnostic intersection 160. In another example, the diagnostic fitting 140C reroutes the diagnostic cord 150 extending from the diagnostic intersection 160 along the alignment interface 350 toward the fourth diagnostic fitting 140D (shown in FIG. 1). Optionally, the tapered portion 326 of the cord recess 320 includes one or more of fillets, chamfers, rounded features or the like to gradually redirect the cord 150 without forming sharp bends or turns that may damage the cord 150.

Referring again to FIG. 3, a fitting leg 360 optionally projects from an interior side 370 of the diagnostic fitting 140C. As described in greater detail herein, the fitting leg 360 cooperates with the first locking bracket 210 (shown in FIGS. 4-6) to couple the diagnostic fitting 140C with the fenestration assembly 100.

In some examples, the plurality of diagnostic fittings 140 (shown in FIG. 1) includes varying profiles (e.g., profiles corresponding to one or more window shapes, sizes, types, manufacturers or the like), thereby allowing use of the diagnostic fittings 140 with a plurality of different fenestration assemblies, including (but not limited to) the fenestration assembly 100 (shown in FIG. 1). For example, additional fittings 140 include different taper angles of the alignment interfaces 200 to correspond with dimensions of fenestration assemblies that are larger, smaller, having different proportions or the like relative to the fenestration assembly 100. In another example, the position of the cord recess 320 relative to the alignment interfaces 200 is varied with additional fittings 140 to match characteristics (e.g., a width or height) of other fenestration assemblies differing from the fenestration assembly 100.

Figure 4:
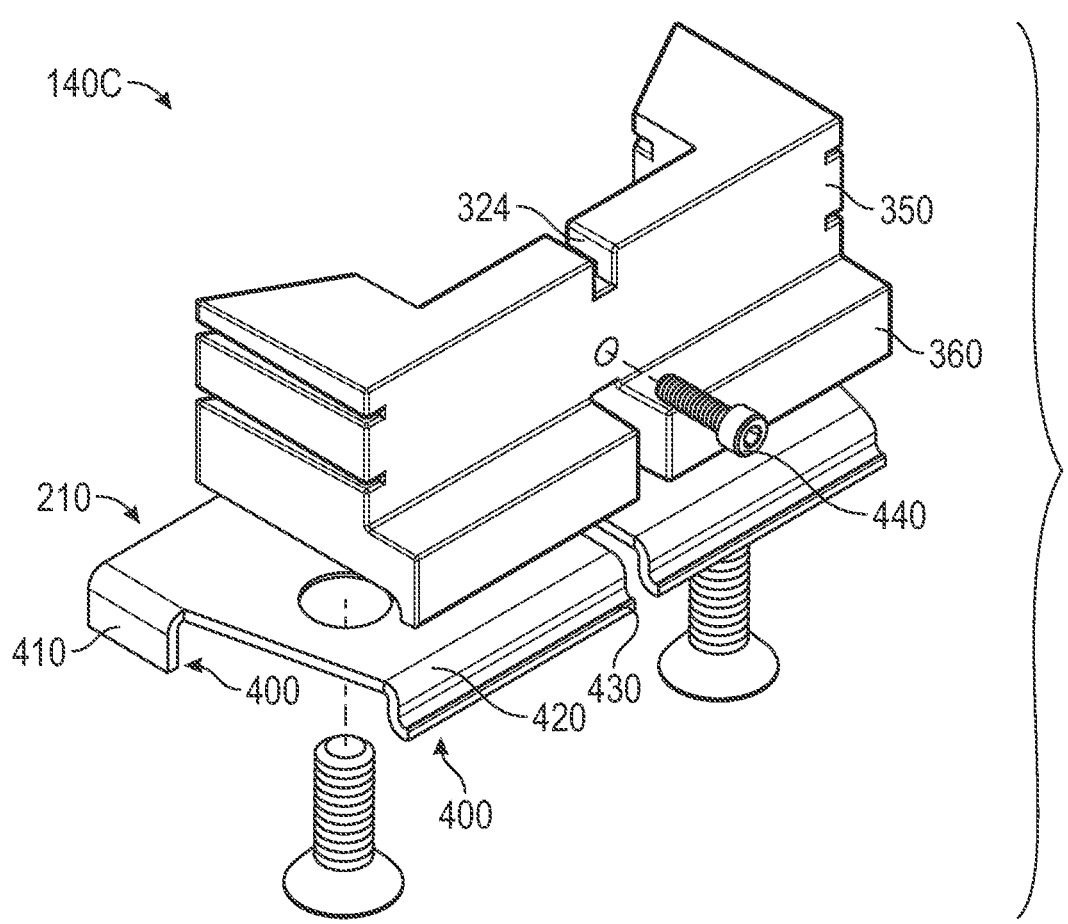
FIG. 4 is a perspective view of the diagnostic fitting and an example of a first locking bracket.

FIG. 4 is a perspective view of the diagnostic fitting 140 (e.g., fitting 140C) and an example of the first locking bracket 210. In an example, the diagnostic fitting 140C is a separate component from the first locking bracket 210. The diagnostic fitting 140C as a separate component from the first locking bracket 210 is readily coupled to locking brackets 210 with varying profiles (e.g., profiles corresponding to one or more fenestration types; attachment features on fenestration assemblies, such as kerfs, posts, recess, pins or the like; or manufacturers). Additionally, coupling of the diagnostic fitting 140C to the locking bracket 210 facilitates use of the diagnostic fitting 140C with a plurality of different fenestration assemblies, including (but not limited to) the fenestration assembly 100 (shown in FIG. 1).

The first locking bracket 210 includes one or more bracket legs 400, for instance a first bracket leg 410 and a second bracket leg 420. In one example, the bracket legs 400 cooperate to prevent motion of the diagnostic fitting 140C along the fenestration assembly 100 in at least one degree of freedom. Accordingly, the bracket legs 400 retain the diagnostic fitting 140C in a static position on the fenestration assembly 100 when installed. In an example, the first bracket leg 410 prevents motion in a first direction and the second bracket leg 420 prevents motion in a second direction (e.g., the second direction is optionally perpendicular to the first direction).

Figure 10:
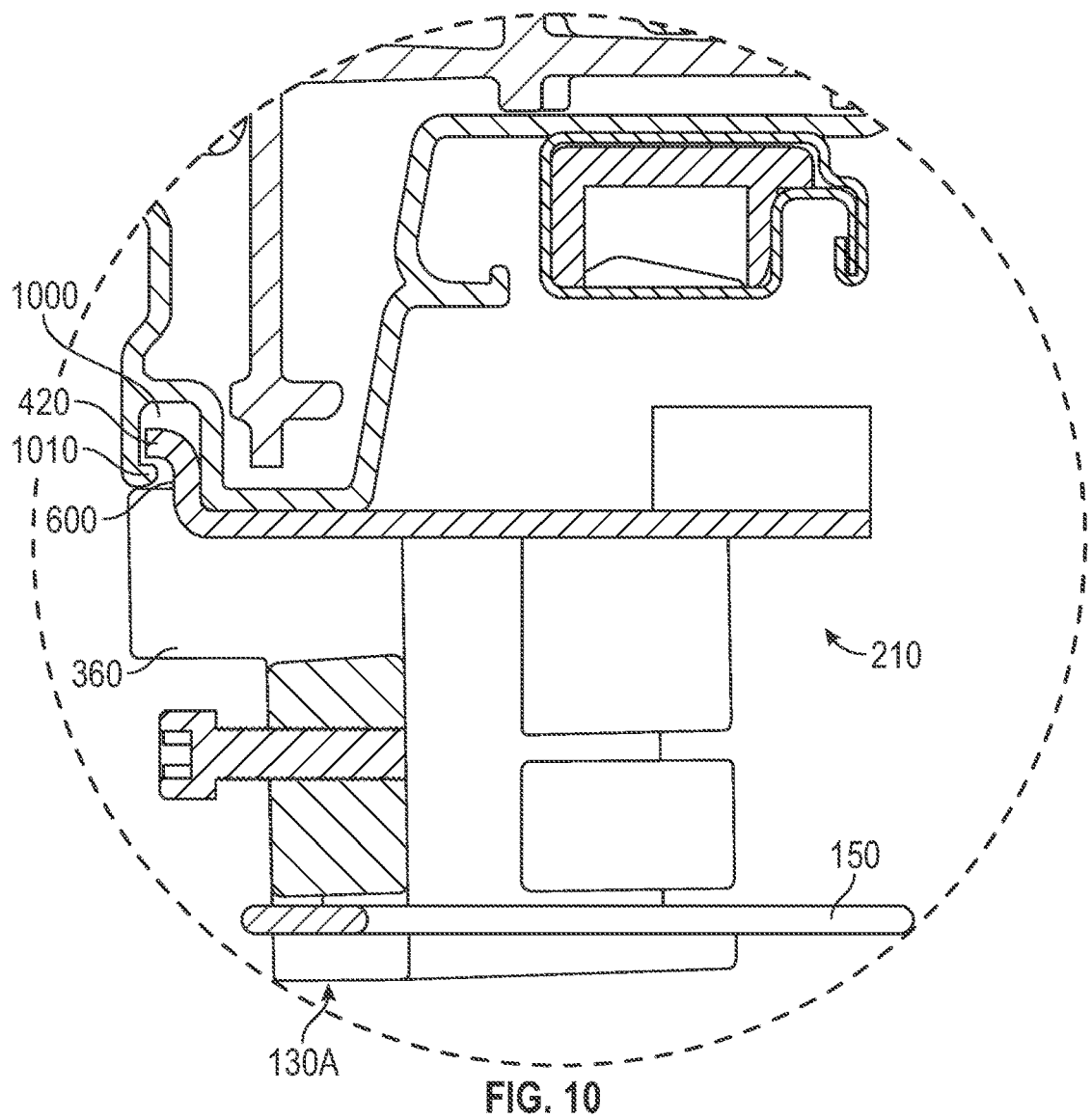
FIG. 10 is a detailed cross-sectional view of a portion of the fenestration assembly of FIG. 9.

In some examples, the second bracket leg 420 includes a clutch interface 430 configured to engage with a kerf (e.g., the accessory kerf 1000 shown in FIG. 10). Accordingly, the engagement of the clutch interface 430 with the kerf couples the diagnostic fitting 140C with the fenestration assembly 100 and enhances the static coupling of the diagnostic fitting 140 (with the locking bracket 210).

A cord fastener 440 is optionally coupled with the third diagnostic block 140C. The cord fastener 440 is configured to fasten the diagnostic cord 150. In an example, the cord fastener 440 is coupled with the diagnostic block 140C, and the cord fastener 440 couples with the diagnostic cord 150. For instance, the cord 150 is knotted, looped, fed through an eyelet or the like to retain (e.g., lock, hold, anchor or the like) the diagnostic cord 150. In another example, the diagnostic block 140C includes a clamp, and manipulation of the cord fastener 440 causes the clamp to engage with cord 150, and thereby retain the diagnostic cord 150.

Figure 5:
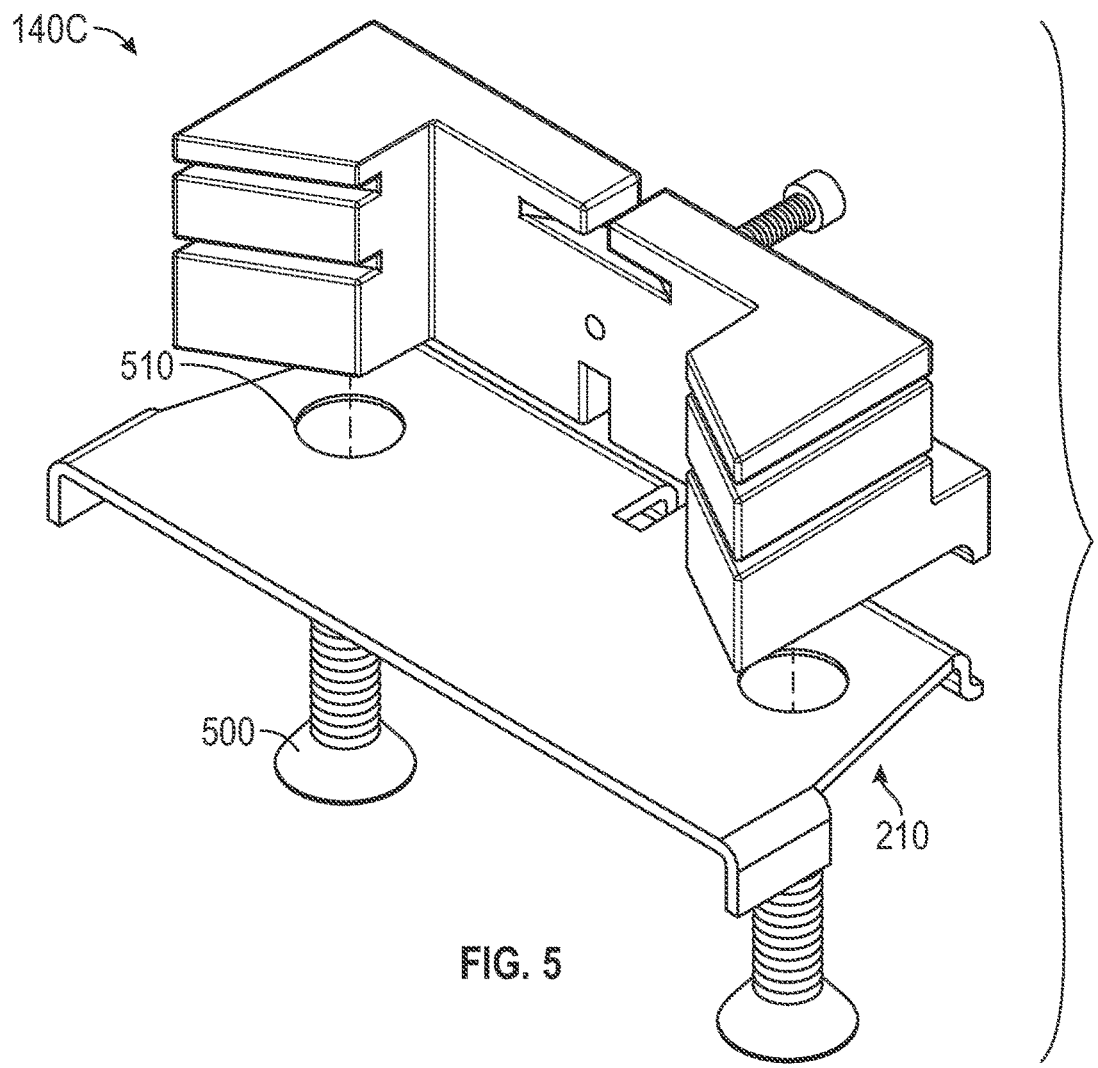
FIG. 5 is another perspective view of the diagnostic fitting and the first locking bracket of FIG. 4.

FIG. 5 is another perspective view of the diagnostic fitting 140C and the locking bracket of FIG. 4. In some examples, one or more bracket fasteners 500 couple the first locking bracket 210 with the diagnostic fitting 140C. In an example, the locking bracket 510 includes a through hole 510 that extends through a thickness of the locking bracket 510. The bracket fastener 500 is received in the through hole 510 of the first locking bracket 210. The bracket fastener 500 engages with the diagnostic fitting 140C (e.g., in a threaded engagement). Accordingly, the engagement of the bracket fastener 500 with the diagnostic fitting 140C couples the locking plate 210 with the diagnostic fitting 140C.

Figure 6:
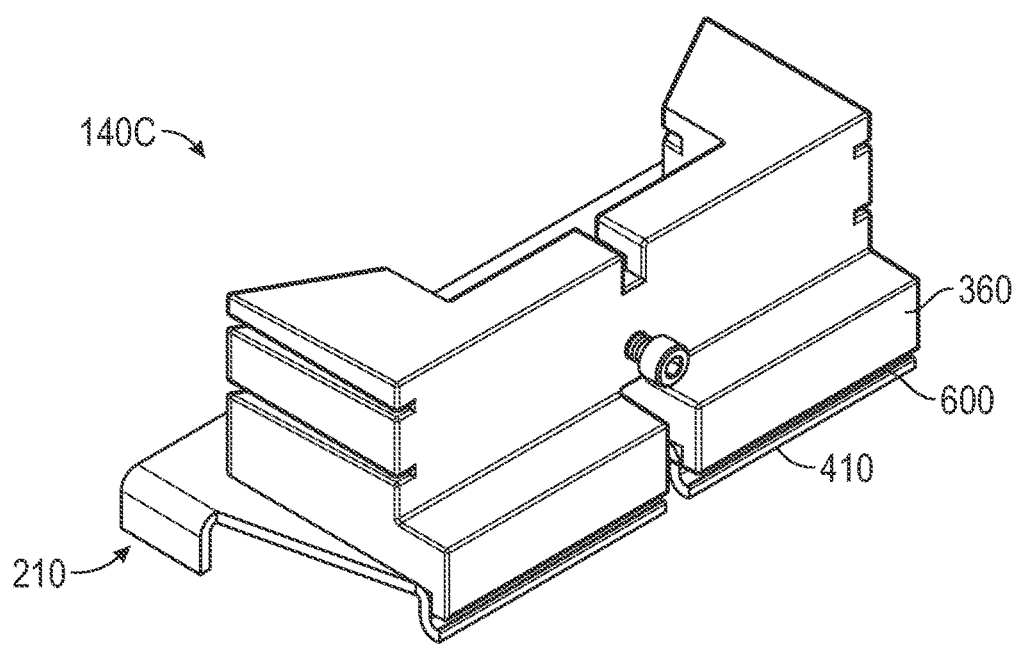
FIG. 6 is yet another perspective view of the diagnostic fitting and the first locking bracket of FIG. 4.

FIG. 6 is yet another perspective view of the diagnostic fitting 140C and the first locking bracket 210 of FIG. 4. In some examples, the diagnostic fitting 140C includes a kerf gap 600. For example, the fitting leg 360 cooperates with one or more of the bracket legs 400 (e.g., including the clutch interface 430 shown in FIG. 4) to retain a fenestration kerf edge (e.g., the kerf edge 1010 shown in FIG. 10) therebetween. The fitting leg 360 and the second bracket leg 420 cooperate to form the kerf gap 600, and the kerf gap 600 captures a portion of the kerf (e.g., the kerf edge 1010 shown in FIG. 10). The engagement of the diagnostic fitting 140C with the kerf couples the diagnostic fitting 140C with the fenestration assembly 100.

Figure 7:
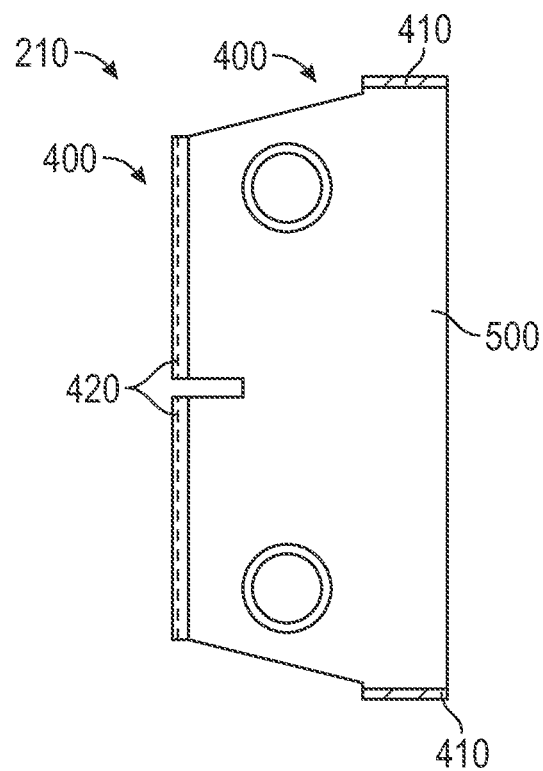
FIG. 7 is a plan view of the first locking bracket of FIG. 4.

FIG. 7 is a plan view of the locking bracket 210 of FIG. 4. As described herein, the locking bracket 410 optionally includes a first bracket leg 410 and a second bracket leg 420. The first bracket leg 410 and the second bracket leg 420 project from a body 500 of the first locking bracket 210. The first locking bracket 210 includes a plurality of profiles (e.g., configurations) for the one or more bracket legs 400. For example, the position, orientation, or dimensions of the first bracket leg 410 or the second bracket leg 420 are varied to correspond to one or more window types or manufacturers, thereby facilitating reuse of the diagnostic fitting 140C with a plurality of different fenestration assemblies (e.g., the fenestration assembly 100 shown in FIG. 1). In an example, the first bracket leg 410 extends from a first edge of the body 500, and the second bracket leg 420 extends from a second edge of the body 500.

Figure 8:
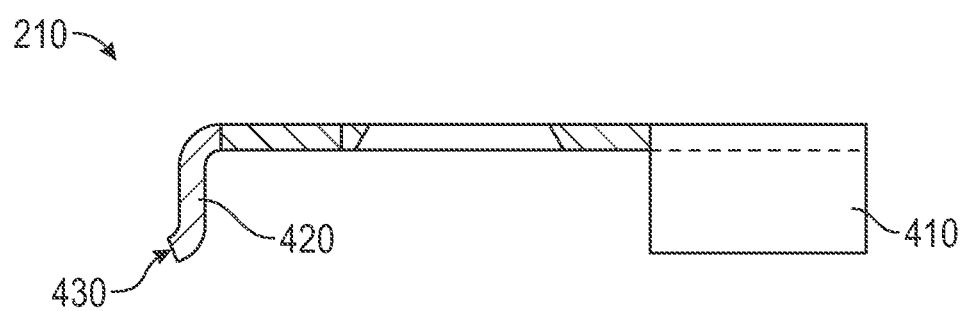
FIG. 8 is a side plan view of the first locking bracket of FIG. 4.

FIG. 8 is a side plan view of the locking bracket of FIG. 4. The second bracket leg 420 optionally includes the clutching interface 430 and the clutching interface 430 engages with a portion of fenestration assembly 100. In another example, the clutching interface 430 cooperates with the fitting leg 360 to optionally to retain a kerf edge (e.g., the kerf edge 1210 shown in FIG. 12) therebetween.

Figure 9:
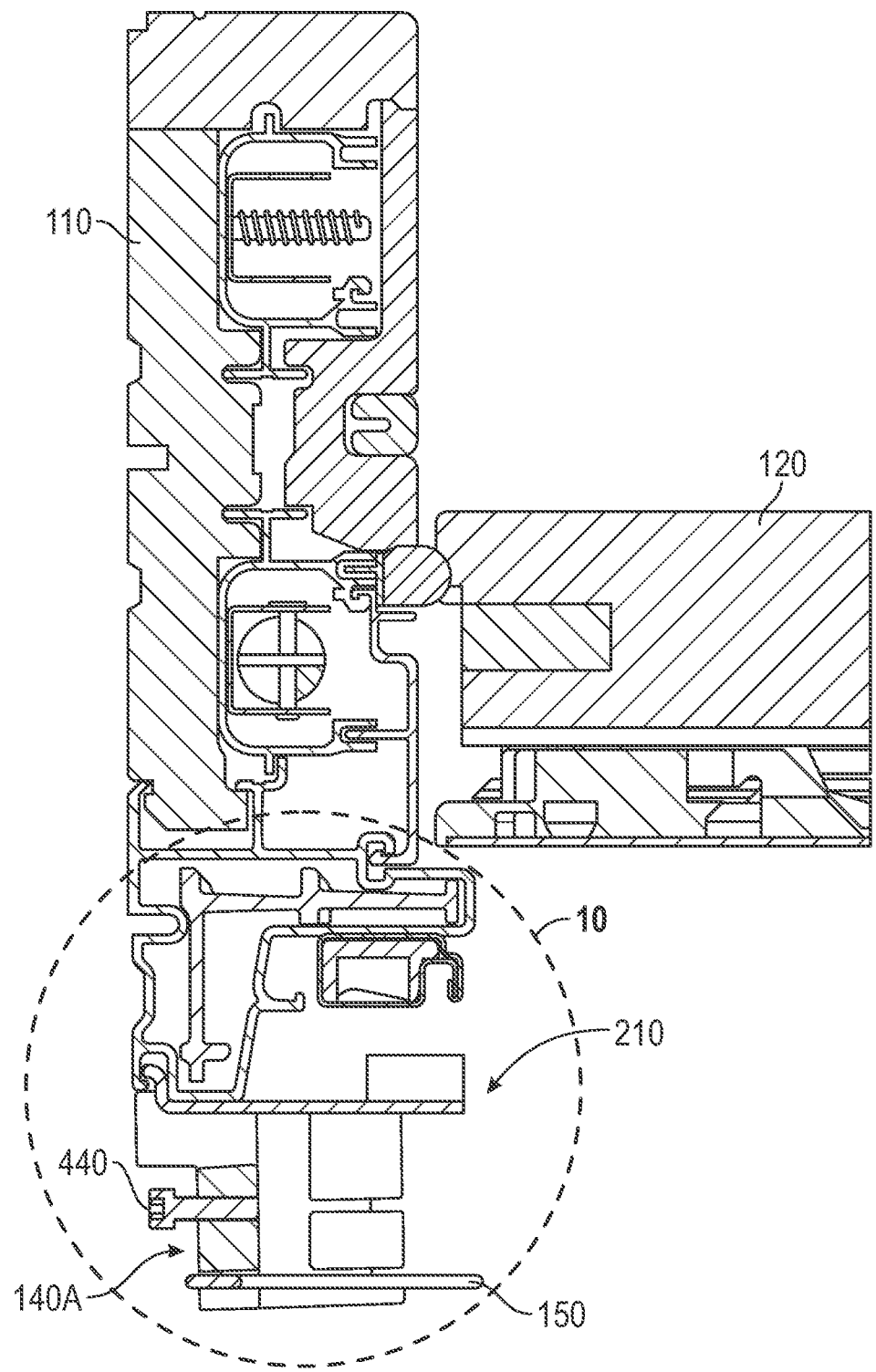
FIG. 9 is a cross sectional view of the fenestration assembly and the diagnostic system of FIG. 1.

FIG. 9 is a cross sectional view of the fenestration assembly 100 and the diagnostic system 130 of FIG. 1. The panel 120, such as a sash, door or the like is moveable relative to the fenestration frame 110. The diagnostic fitting 140A is coupled to the fenestration frame 110 with the first locking bracket 210. Manipulation of the cord fastener 440 (e.g., tying of the cord to the fastener, clamping of the cord or the like) fastens the diagnostic cord 150 to the diagnostic fitting 140A.

FIG. 10 is a detailed cross-sectional view of a portion of the fenestration assembly 100 of FIG. 9. As described herein, the diagnostic fitting 140A statically couples with the fenestration assembly 110. For example, the second bracket leg 420 optionally includes a clutch interface 430 (shown in FIG. 8), and the clutch interface 430 optionally engages with an accessory kerf 1000. The engagement of the clutch interface 430 with the accessory kerf 1000 thereby couples the diagnostic fitting 140A with the fenestration assembly 100.

In some examples, the diagnostic fitting 140A has the kerf gap 600. For example, the fitting leg 360 optionally cooperates with the second bracket leg 420 and the clutching interface 430 to retain a fenestration kerf edge 1010 therebetween. In an example, the fitting leg 360 and the second bracket leg 420 cooperate to form the kerf gap 600. The kerf gap 600 captures the kerf edge 1010, and the engagement (e.g., interlocking, intermeshing, or the like) of the diagnostic fitting 140A with the kerf 1000 thereby couples the diagnostic fitting 140A with the fenestration assembly 100. Optionally, the second bracket leg 420 cooperates with the first bracket leg 410 (shown in FIG. 8) to prevent motion of the diagnostic fitting 140C along the fenestration assembly 100 in at least one degree of freedom to thereby retain the diagnostic fitting 140A in a static position when installed (e.g., at a corner of the fenestration assembly 100).

Figure 11:
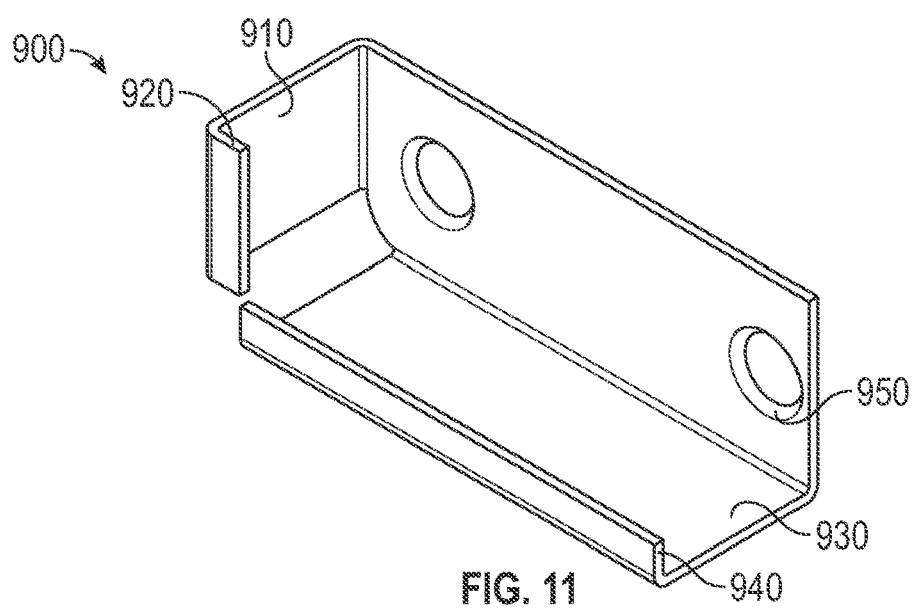
FIG. 11 is an example of a second locking bracket.

FIG. 11 is an example of a second locking bracket 900. The second locking bracket 900 has a different profile than the first locking bracket 210 (shown in FIGS. 7 and 8). For example, a first bracket leg 910 includes a first flange 920; and a second bracket leg 930 includes a second flange 940. The first flange 920 and the second flange 940 couple around (e.g., wrap) a portion of the fenestration assembly 100, such as cladding, the frame 110 or the like and engage with the fenestration assembly 100 to prevent the motion of the first diagnostic fitting 140A (shown in FIG. 12).

Figure 12:
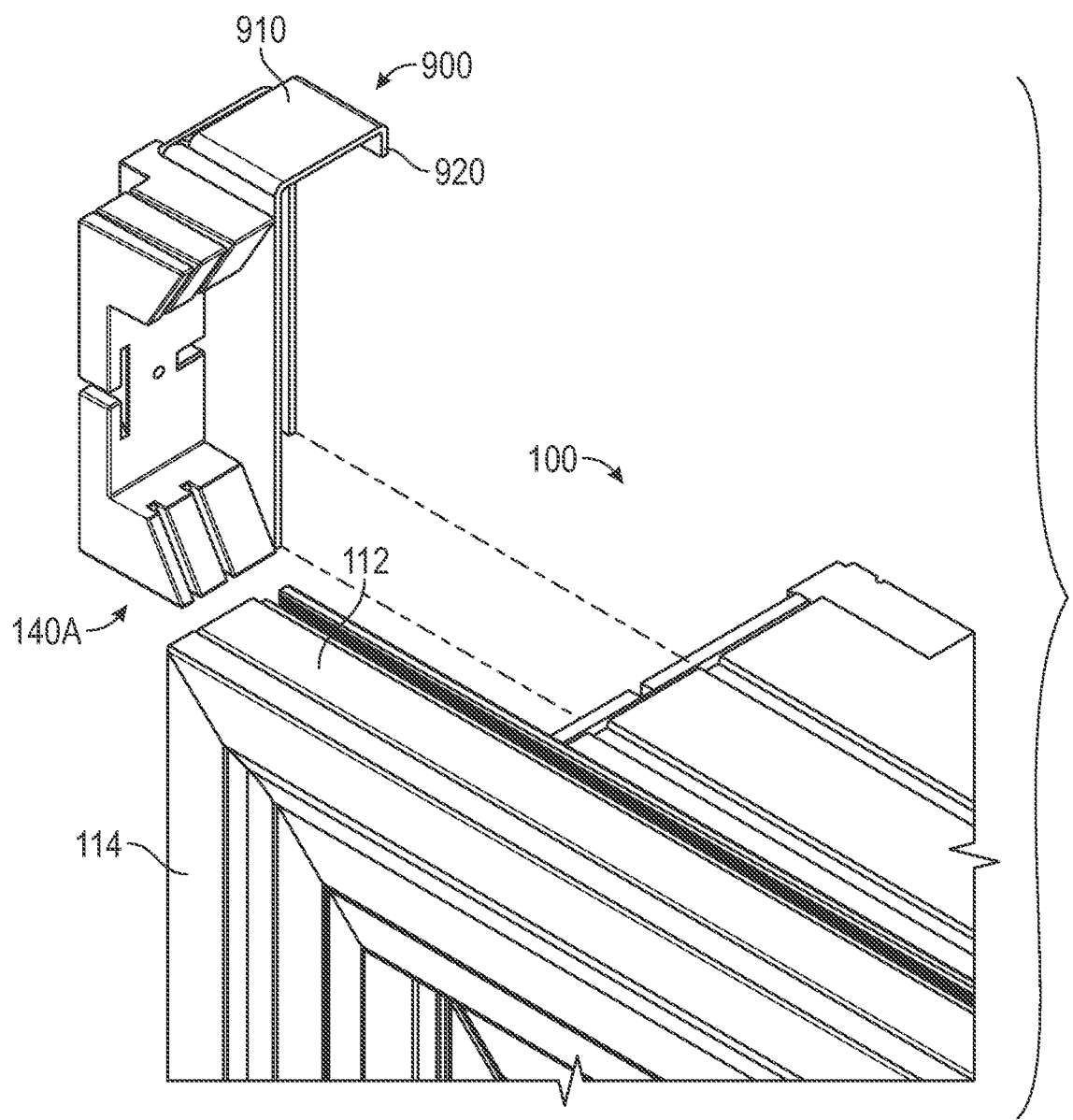
FIG. 12 is another perspective view of the fenestration assembly and the diagnostic system of FIG. 1.

FIG. 12 is another perspective view of a portion of the fenestration assembly 100 and the diagnostic system 130 of FIG. 1. As described herein, the second locking bracket 900 couples (e.g., wraps) around a portion of the fenestration assembly 100. In an example, the first bracket leg 910 is configured to engage with the header 112, and the first flange 920 extends around the header 112. The engagement of the first bracket leg 110 with the header 110 prevents motion (e.g., vertical motion) of the first diagnostic fitting 140A.

The second bracket leg 930 is engaged with the first jamb 114, and the second flange 940 extends around the first jamb 114. The engagement of the second bracket leg 930 with the first jamb 114 prevents motion (e.g., lateral motion) of the first diagnostic fitting 140A. In some examples, the first bracket leg 910 and the second bracket leg 930 cooperate to prevent motion in one or more degrees of freedom of the diagnostic fitting 140A relative to the fenestration assembly 100. For example, the engagement of the first bracket leg 910 and the second bracket leg 930 with the fenestration assembly 100 provides one or more coupling forces between the second locking bracket 900 and the fenestration assembly 100. The coupling forces statically couple (e.g., hold, retain, anchor or the like) the first diagnostic fitting 140A with the fenestration assembly 100.

In another example, the routing of the diagnostic cord 150 through the plurality of diagnostic fittings 140 (shown in FIG. 1) provides a tension force between the plurality of diagnostic fittings 140, and the tension force enhances the static coupling of the plurality of diagnostic fittings 140 with the fenestration assembly. In yet another example, a surface of the second locking bracket 900 is treated to increase the friction, or coupling force, between the second locking bracket 900 and the fenestration assembly 100 (e.g., the header 112). For example, the surface of the second locking bracket 900 optionally includes knurling or an increased surface roughness to increase friction forces between the second locking bracket 900 and the fenestration assembly 100. In some examples, an adhesive (e.g., a temporary adhesive) is utilized at the interface between the second locking bracket 900 and the fenestration assembly 100 to increase the coupling force between second locking bracket 900 and the fenestration assembly 100. In yet another example, the diagnostic fitting 140A is coupled to the fenestration assembly 100 with a temporary adhesive (e.g., double-sided tape or the like), a fastener, clamps, or corresponding design features included in the fenestration assembly (e.g., the accessory kerf 1000 shown in FIG. 10). For example, a fastener is driven through the diagnostic fitting 140A and into the header 112.

FIG. 13 is a schematic view of the fenestration assembly 100 and the diagnostic system 130 of FIG. 1. In this example, the fenestration assembly 100 is not square (is not level). As shown, the fenestration assembly 100 in FIG. 13 is not square because a top portion of the fenestration assembly 100 is shifted with respect to a bottom portion of the fenestration assembly 100 (e.g., the fenestration frame is parallelogram in shape, instead of square or rectangular in shape). The angle between the first jamb 114 and the sill 118 is not 90 degrees. Instead, the angle between first jamb 114 and the sill 118 is 90−α degrees. Stated another way, the first jamb 114 is not vertical or plumb. Accordingly, the fenestration assembly 100 does not comply with at least one threshold installation characteristic (here, square).

As further shown in FIG. 13, the plurality of diagnostic fittings 140 are coupled to the fenestration assembly 100 at specified locations. For example, the diagnostic fittings 140A, 140C, 140D, and 140E are positioned proximate to corners of the fenestration assembly 100. The diagnostic cord 150 is routed through the plurality of diagnostic fittings 140. In this example, the plumb length 150A of the cord 150 (optionally coupled with the plumb bob 170) does not intersect with other portions of the diagnostic cord 150 at the diagnostic intersection 160. Instead, the plumb length 150A is shifted with respect to the diagnostic intersection 160 and a lateral gap 1300 exists between the plumb length 150A and other portions of the diagnostic cord 150. Conversely, the fenestration assembly 100 is square and level if the plumb length 150A is aligned with the lengths of the diagnostic cord 150 at the diagnostic intersection 160. In this example, because of the lateral gap 1300 shown in FIG. 13, the user (e.g., installer) readily determines with the diagnostic system 130 that the fenestration assembly 100 is not square.

FIG. 14 is a schematic view of the fenestration assembly 100 and the diagnostic system 130 of FIG. 1. In this example, the fenestration assembly 100 is square, or level. The fenestration assembly 100 shown in FIG. 14 is square because an upper portion of the fenestration assembly 100 is not laterally shifted with respect to a lower portion of the fenestration assembly 100 (e.g., the fenestration assembly is square or rectangular in shape). For instance, the angle between the first jamb 114 and the sill 118 is 90 degrees. Accordingly, the fenestration assembly 100 in FIG. 14 is within square threshold installation characteristics. The square characteristic of the fenestration assembly 100 is readily apparent to the user. The lateral gap 1300 shown in FIG. 13 for the not square example of the assembly 100 is visibly absent in the example of FIG. 14, and thereby indicates to the user that the fenestration assembly is square.

As described herein, in an example, the plurality of diagnostic fittings 140 are coupled to the fenestration assembly 100 at specified locations. For example, the diagnostic fittings 140A, 140C, 140D, 140E are positioned proximate to corners of the fenestration assembly 100. The diagnostic cord 150 is routed through the plurality of diagnostic fittings 140. In this example, the plumb length of the cord 150A (that is optionally coupled with the plumb bob 170) intersects with (e.g., is aligned with) other portions of diagnostic cord 150 at the diagnostic intersection 160 because the fenestration assembly 100 is square. Accordingly, the lateral gap 1300 is eliminated. The diagnostic system 130 is readily assessed (e.g., by a user) that the fenestration assembly 100 is square and level, and that the fenestration assembly 100 is within the threshold installation characteristics.

In other examples, fenestration assemblies have a variety of profiles or shapes similar or different relative to the fenestration assembly 100. In one example, the fenestration assembly 100 is circular. In another example, the fenestration assembly 100 is triangular. Use of corresponding diagnostic fittings 140 of the diagnostic system 130 for the various fenestration assemblies facilitates the assessment of installation characteristics specific to the varying profiles of the fenestration assemblies. For example, fittings 140 are used having dimensions, shapes or profiles of the fittings, such as angles of the tapered surface 205 of the alignment interfaces 200 that correspond with the profile of the fenestration assembly installed (e.g., and having a differing profile).

Figure 15:
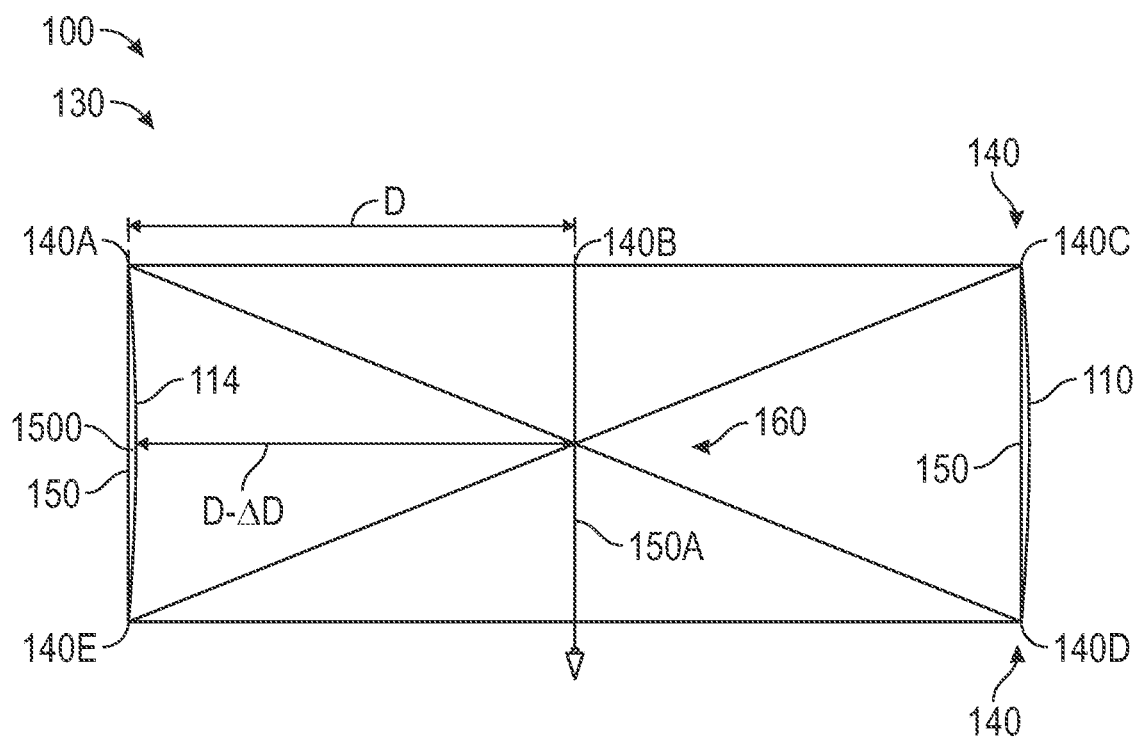
FIG. 15 is a schematic view of the fenestration assembly and the diagnostic system of FIG. 1, where the fenestration assembly is not square, or is bowed.

FIG. 15 is a schematic view of the fenestration assembly 100 and the diagnostic system 130 of FIG. 1. In this example the fenestration assembly 100 is not square, or is bowed (e.g., deflected, curved, concave, convex, or the like). The fenestration assembly 100 shown in FIG. 15 is not true because sides of the fenestration assembly 100 are deflected relative to each other. In an example, the first jamb 114 is deflected inward (to the left) and toward a center of the fenestration assembly 100. The deflection is exaggerated for illustration purposes. In contrast the second jamb 116 is deflected outward (to the right). Accordingly, the fenestration assembly 100 does not comply with the square threshold installation characteristic and instead includes jamb bow.

As previously described herein, the plurality of diagnostic fittings 140 are coupled to the fenestration assembly 100 at specified locations. For example, the second diagnostic fitting 140B is proximate a midpoint of the fenestration assembly 100 (e.g., at a midpoint of the header 112, shown in FIG. 1). The plumb length 150A of the cord 150 extends from the second diagnostic fitting 140B, and the plumb bob 170 is suspended by the plumb length 150A of the cord 150. The other fittings 140A, C, D, E are positioned proximate to the assembly 100 corners.

At a top portion of the fenestration assembly 100, the first jamb 114 is at a first distance D from the plumb length 150A of the diagnostic cord 150. Because the fenestration assembly 100 is bowed, a center portion the first jamb 114 is at a second distance D−ΔD from the plumb length 150A. The diagnostic system 130 is readily assessed to determine that the fenestration assembly 100 is not square (or is bowed) because the bowing of the fenestration assembly 100 is detectable with the diagnostic system 130. For instance, the portion of the diagnostic cord 150 routed between the first diagnostic fitting 140A and the fifth diagnostic fitting 140E is taut and thereby linear. Because the first jamb 114 is bowed, a linear gap 1500 exists between the diagnostic cord 150 and the bowed first jamb 114. Accordingly, the diagnostic system 130 is readily assessed by the user to determine that the fenestration assembly 100 is not square (has jamb bow). The user is then able to reorient the fenestration assembly 100 (e.g., by shimming or the like) to minimize (including eliminate or minimize) the linear gap 1500 and thereby make the fenestration assembly 100 square (eliminate the bowing of the fenestration assembly 100). In this example, because of the lateral gap 1500 shown in FIG. 15, the user (e.g., installer) readily determines with the diagnostic system 130 that the fenestration assembly 100 is not square.

Figure 16:
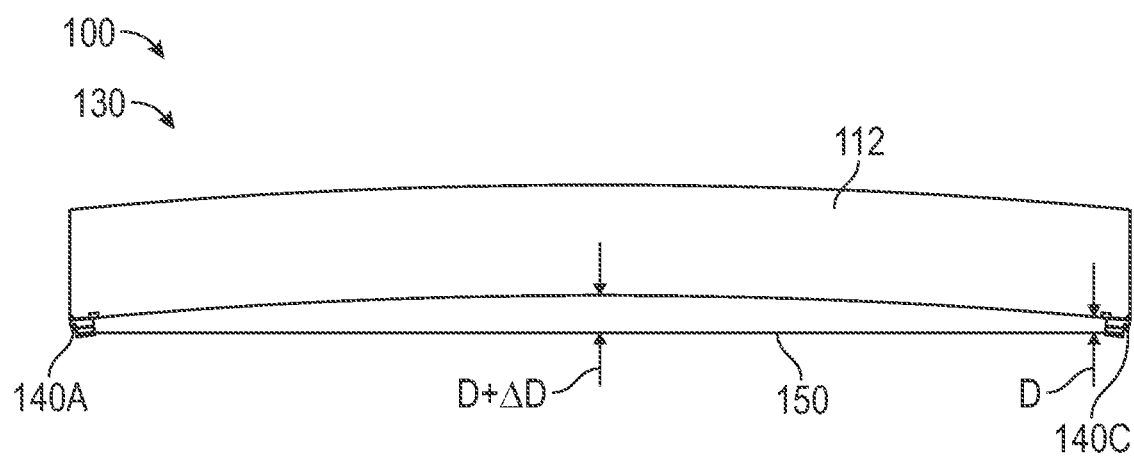
FIG. 16 is another schematic view of the fenestration assembly and the diagnostic system of FIG. 1, where the fenestration assembly is not square, or is bowed.

FIG. 16 is another schematic view of the fenestration assembly 100 and the diagnostic system 130 of FIG. 1. In this example, the fenestration assembly 100 is not square, or is bowed. As shown, the fenestration assembly 100 in FIG. 16 is not square because sides of the fenestration assembly 100 are bowed. The header 112 and the sill 118 are bowed and the window assembly 100 is not planar. Accordingly, the fenestration assembly 100 does not comply with threshold installation characteristics (here, square).

As further shown in FIG. 16, diagnostic fittings 140 are coupled to the fenestration assembly 100 at specified locations. In an example, the diagnostic fittings 140A and 140C are coupled to the fenestration assembly 100 proximate the header 112. The diagnostic cord 150 is routed between the diagnostic fittings 140A and 140C. The diagnostic cord 150 routed between the diagnostic fitting 140A and 140C is spaced at a first distance D from the fenestration assembly 100. Because the fenestration assembly 100 is not square (e.g., bowed), the spacing between the diagnostic cord 150 and the fenestration assembly 100 (e.g., the header 112 or the sill 118, shown in FIG. 1) is variable along a length of the diagnostic cord 150. For example, the distance between a center of the header 112 and the diagnostic cord 150 is a second distance D+ΔD when the fenestration assembly 100 is not square. The change in distance (ΔD) between the fenestration assembly 100 and the diagnostic cord 150 is readily apparent to the user. Accordingly, the user is able to change the orientation of the fenestration assembly 100 to bring the fenestration assembly 100 into square. For example, the orientation of the fenestration assembly is changed to make the distance between the diagnostic cord and the header 112 consistent (e.g., not variable) and thereby make the fenestration assembly 100 square.

FIG. 17 is a schematic view of the fenestration assembly 100 and the diagnostic system 130 of FIG. 1, where the fenestration assembly 100 is not true, or is twisted (e.g., warped). The fenestration assembly 100 is not true because the first sill 114 is not aligned with (e.g., out of plane with) the second sill 116. Accordingly, the fenestration assembly 100 does not comply with at least one threshold installation characteristic.

As further shown in FIG. 17, the plurality of diagnostic fittings 140 are coupled to the fenestration assembly 100, and the diagnostic cord 150 is routed through the plurality of diagnostic fittings 140. In an example, the diagnostic fitting 130A is positioned proximate the first jamb 114 (e.g., a top corner) and the diagnostic fitting 140C is positioned proximate the second jamb 116. A first portion 150B of the diagnostic cord 150 is routed from the diagnostic fitting 140C along the second jamb 116, toward the diagnostic fitting 140D (shown in FIG. 1). A second portion 150C of the diagnostic cord 150 is routed from the diagnostic fitting 140A along the first jamb 114, toward the diagnostic fitting 140E (shown in FIG. 1).

In this example, because the fenestration assembly 100 is not true (e.g., twisted or warped), the portions of the diagnostic cord 150B, 150C do not intersect at the diagnostic intersection 160. Instead, as shown in FIG. 17, a lateral gap 1700 exists between the first portion 150B of the diagnostic cord 150 and the second portion 150C of the diagnostic cord 150. In this example, because of the lateral gap 1700 shown in FIG. 17, the user readily determines with the diagnostic system 140 that the fenestration assembly 100 is not true.

In another example, the fenestration assembly 100 is not true (e.g., twisted or warped), and the portions 150B, 150C of the diagnostic cord 150 fold over each other (e.g., engage or overlap). The user readily identifies the fold and accordingly identifies that the assembly 100 is not true. Without the diagnostic system 130 described herein the assessment of true is inconsistent and difficult to conduct by observation alone. In contrast, the diagnostic system 130 provides a clear observable feature, folding at the intersection to quickly assess true. For example, if the first jamb 114 is not aligned with the second jamb 114 (e.g., as shown in FIG. 17) portions of the diagnostic cord 150 fold over each other, and accordingly a user readily determines through observation of the fold that the fenestration assembly 100 is not true.

FIG. 18 is a schematic view of the fenestration assembly 100 and the diagnostic system 130 of FIG. 1. In this example, the fenestration assembly 100 is true, or is not twisted. The fenestration assembly 100 is true because the first jamb 114 is aligned with the second jamb 116 (shown in FIGS. 1 and 17). Accordingly, the fenestration assembly 100 is within true threshold installation characteristics.

As previously described herein, the diagnostic system 130 is readily assessed to determine whether the fenestration assembly 100 is not true, and accordingly the orientation of the fenestration assembly 100 is changed (e.g., by moving the first jamb 114) to make the fenestration assembly 100 true. The true characteristic of the is readily apparent to the user. The lateral gap 1700 shown in FIG. 17 for the not true example of the assembly 100 is visibly absent in the example of FIG. 18, and thereby indicates to the user that the fenestration assembly 100 is true.

FIG. 19 is a schematic view of the fenestration assembly 100 and the diagnostic system 130 of FIG. 1. In this example, the fenestration assembly 100 is not plumb, or is tilted. As shown, the fenestration assembly 100 is not plumb because the fenestration assembly 100 is tilted forward with respect to a rough opening in a structure (e.g., at the angle 90+α degrees). Accordingly, the fenestration assembly 100 does not comply with at least one threshold installation characteristic.

As further shown in FIG. 19, when the fenestration assembly 100 is not plumb, the plumb length 150A of the diagnostic cord 150 does not intersect with other portions of the diagnostic cord 150 at the diagnostic intersection 160, and a depth gap 1900 exists between the plumb length 150A and other portions of the diagnostic cord 150. In this example, because of the depth gap 1900, the user readily determines with the diagnostic system 130 that the fenestration assembly 100 is not plumb. The user is then able to change the orientation of the fenestration 150 to minimize the depth gap 1900, and thereby make the fenestration assembly 100 plumb. For example, the orientation of the fenestration assembly 100 is adjusted to make the plumb length 150A parallel with other portions of the diagnostic cord 150 (e.g., the portion of the diagnostic cord 150 extending between the diagnostic fitting 140A and the diagnostic fitting 140E, shown in FIG. 1).

In another example, the fenestration assembly is not plumb because the fenestration assembly 100 is tilted backward (e.g., at the angle 90–α degrees). If the fenestration assembly 100 is tilted backward, the plumb length 150A of the diagnostic cord 150 folds over the other portions of the diagnostic cord 150 (e.g., at the diagnostic intersection 160). Accordingly, a user readily determines with the diagnostic system 130 that the that the fenestration assembly 100 is not plumb. The user is then able to change the orientation of the fenestration 150 to minimize the folding of the plumb length 150A over the other portions of the diagnostic cord 150.

Figure 20:
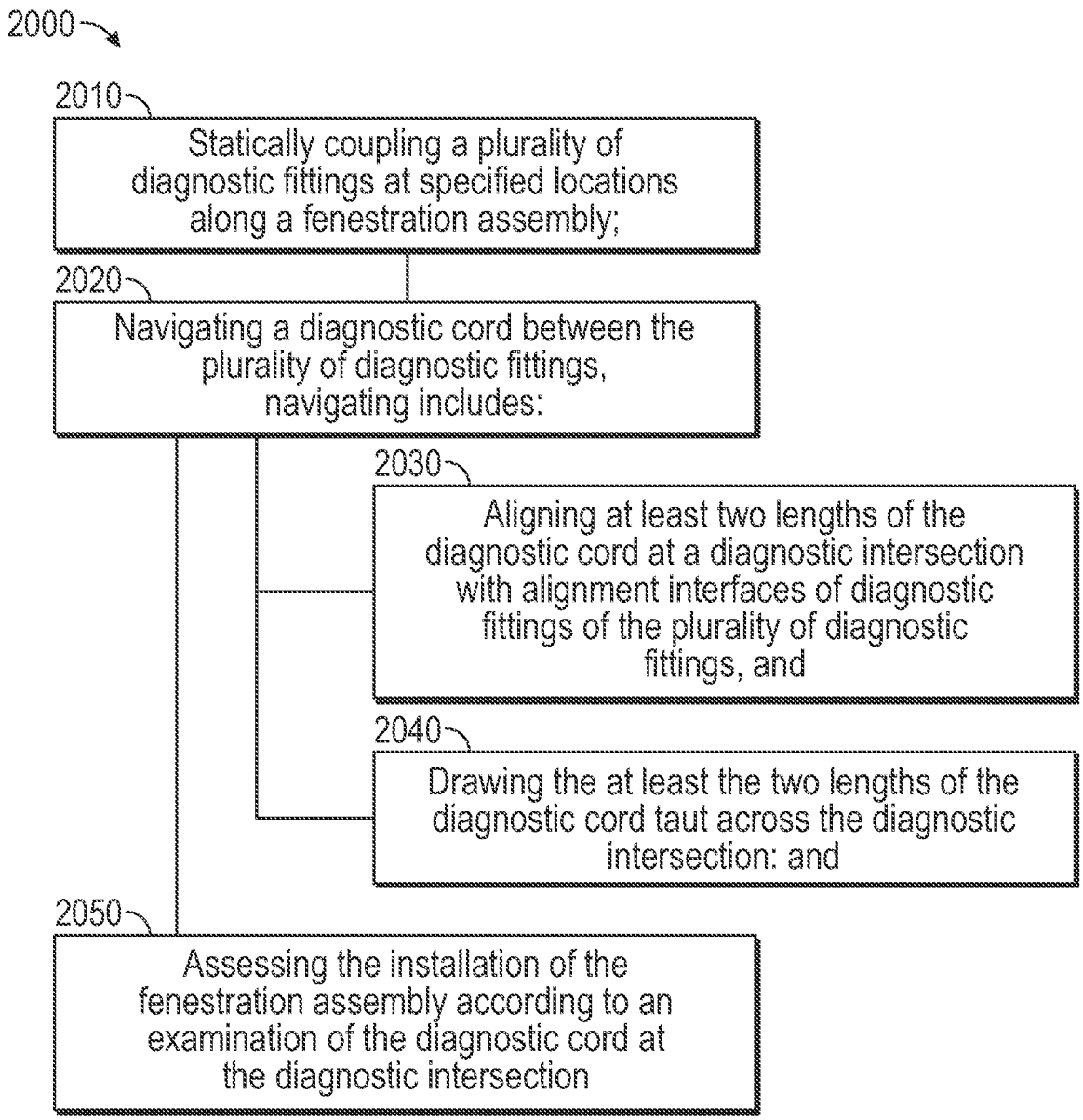
FIG. 20 is a block diagram of one example of a method for diagnosing a fenestration assembly installation.

FIG. 20 shows one example of a method 2000 for diagnosing a fenestration assembly installation, including use of one or more of the diagnostic system 130. In describing the method 2000, reference is made to one or more components, features, functions and operations previously described herein. Where convenient, reference is made to the components, features, operations and the like with reference numerals. The reference numerals provided are exemplary and are not exclusive. For instance, components, features, functions, operations and the like described in the method 2000 include, but are not limited to, the corresponding numbered elements provided herein and other corresponding elements described herein (both numbered and unnumbered) as well as their equivalents.

At 2010, a plurality of diagnostic fittings 140 are coupled at specified locations along a fenestration assembly 100. In an example, one or more bracket legs of each of the diagnostic fittings 140 are coupled with a fenestration frame 110 of the fenestration assembly 100 (e.g., proximate corners of the fenestration assembly 100). In another example, clutching interfaces 430 of each of the diagnostic fittings 140 are coupled with an accessory kerf 1000 of the fenestration assembly 100. At 2020, the method 2000 includes routing a diagnostic cord 150 between the plurality of diagnostic fittings 140. For example, the diagnostic cord 150 is wound along cord guides of the plurality of diagnostic fittings.

At 2030, routing a diagnostic cord 150 includes aligning at least two lengths of the diagnostic cord 150 at a diagnostic intersection 160 with alignment interfaces 200 of diagnostic fittings of the plurality of diagnostic fittings 140. In an example, the diagnostic cord 150 is suspended across the diagnostic intersection 160. A plumb length 150A of the diagnostic cord is suspended from a diagnostic fitting (e.g., the first diagnostic fitting 140A) of the plurality of diagnostic fittings 140 with a plumb bob 170. The plumb length 150A optionally intersects the diagnostic intersection 160. In another example, the diagnostic cord 150 is passed through alignment recesses 302 of the alignment interfaces 200. At 2040, routing a diagnostic cord 150 includes drawing the at least the two lengths of the diagnostic cord 150 taut across the diagnostic intersection 160.

At 2050, the installation of the fenestration assembly 100 is assessed according to an examination of the diagnostic cord 150 at the diagnostic intersection 160. In an example, the installation is assessed as true if there is no gap between the lengths of the diagnostic cord 150 at the diagnostic intersection 160. In another example, the installation is assessed as true if there is no engagement and folding of the diagnostic cords 150 at the diagnostic intersection 160. In yet another example, the installation is assessed as true if there is no depth gap 1900 between the plumb length 150A and the lengths of the diagnostic cord 150 at the diagnostic intersection 160. In still yet another example, the installation is assessed as true if there is no engagement and folding of the plumb length 150A at the diagnostic intersection 160. Assessment of the installation of the fenestration assembly 100 optionally includes determining if the fenestration assembly 100 is square and level. The fenestration assembly 100 is square and level if the plumb length 150A is aligned with the lengths of the diagnostic cord 150 at the diagnostic intersection 160.

Various Notes & Examples

Example 1 can include subject matter such as a fenestration installation diagnostic system comprising: a diagnostic cord; and a plurality of diagnostic fittings configured for coupling with a fenestration assembly, each of the diagnostic fittings includes: at least one bracket leg configured to statically couple the diagnostic fitting with fenestration assembly, at least one alignment interface configured to receive the diagnostic cord and align the diagnostic cord at a diagnostic intersection, and at least one cord guide configured to route the diagnostic cord along the diagnostic fitting and toward another diagnostic fitting of the plurality of diagnostic fittings.

Example 2 can include, or can optionally be combined with the subject matter of Example 1, to optionally include wherein the diagnostic cord includes a plumb bob proximate an end of the diagnostic cord.

Example 3 can include, or can optionally be combined with the subject matter of one or any combination of Examples 1 or 2 to optionally include wherein one or more of the diagnostic fittings of the plurality of diagnostic fittings includes: a locking bracket having the at least one bracket leg, and a diagnostic block coupled with the locking bracket, the diagnostic block having the at least one alignment interface and the at least one cord guide.

Example 4 can include, or can optionally be combined with the subject matter of one or any combination of Examples 1-3 to optionally include wherein the diagnostic block and the locking bracket are integral or separate components.

Example 5 can include, or can optionally be combined with the subject matter of one or any combination of Examples 1-4 to optionally include wherein the at least one bracket leg includes at least two bracket legs, and at least one of the two bracket legs includes a clutching interface configured for locking reception within an accessory kerf of the fenestration assembly.

Example 6 can include, or can optionally be combined with the subject matter of Examples 1-5 to optionally include wherein the clutching interface includes a flange extending at an angle relative to a remainder of the bracket.

Example 7 can include, or can optionally be combined with the subject matter of Examples 1-6 to optionally include wherein the diagnostic fitting includes a fitting leg extending along the clutching interface with a kerf gap therebetween, and the fitting leg and the clutching interface cooperate to receive a kerf edge of the fenestration assembly therein.

Example 8 can include, or can optionally be combined with the subject matter of Examples 1-7 to optionally include wherein the at least one alignment interface includes at least first and second alignment interfaces having respective first and second alignment recesses, and the first alignment interface including the first alignment recess extends at a first angle, the second alignment interface including the second alignment recess extends at a second angle, and a cord recess is between the first and second alignment interfaces, and the cord recess and at least one of the first and second alignment recesses cooperate to align the diagnostic cord at the diagnostic intersection.

Example 9 can include, or can optionally be combined with the subject matter of Examples 1-8 to optionally include wherein the first and second alignment interfaces include surfaces that taper toward the cord recess.

Example 10 can include, or can optionally be combined with the subject matter of Examples 1-9 to optionally include wherein the alignment interface includes first and second alignment recesses, the first alignment recess is proximate a fitting interior of the diagnostic fitting, and the second alignment recess is proximate a fitting exterior of the diagnostic fitting.

Example 11 can include, or can optionally be combined with the subject matter of Examples 1-10 to optionally include wherein the alignment interface includes one or more of a groove, ridge, furrow, recess, a fork or a post.

Example 12 can include, or can optionally be combined with the subject matter of Examples 1-11 to optionally include the fenestration assembly.

Example 13 can include, or can optionally be combined with the subject matter of Examples 1-12 to optionally include wherein in a diagnostic configuration each of the diagnostic fittings is statically coupled at respective specified locations along the fenestration assembly, and the diagnostic cord is routed between each of the diagnostic fittings along the respective at least one alignment interfaces, and in the diagnostic configuration the diagnostic cord aligned by the alignment interfaces extends to the diagnostic intersection.

Example 14 can include, or can optionally be combined with the subject matter of Examples 1-13 to optionally include wherein the intersection of the diagnostic cord at the diagnostic intersection is configured to assess one or more installation characteristics of the fenestration assembly including level, plumb, square, jamb bow or true.

Example 15 can include, or can optionally be combined with the subject matter of Examples 1-14 to optionally include wherein the diagnostic cord and the plurality of diagnostic fittings are included in a kit.

Example 16 can include, or can optionally be combined with the subject matter of Examples 1-15 to optionally include a fenestration installation diagnostic system comprising: a plurality of diagnostic fittings configured for static coupling along a fenestration assembly, each of the diagnostic fittings includes: at least one alignment interface, and at least one cord guide; a diagnostic cord; and wherein the plurality of diagnostic fittings and the diagnostic cord are configured for coupling with the fenestration assembly in a diagnostic configuration including: each of the diagnostic fittings statically coupled at specified locations of the fenestration assembly, and the diagnostic cord tautly extending from the respective alignment interfaces of the plurality of diagnostic fittings to a diagnostic intersection.

Example 17 can include, or can optionally be combined with the subject matter of Examples 1-16 to optionally include the fenestration assembly.

Example 18 can include, or can optionally be combined with the subject matter of Examples 1-17 to optionally include wherein in the diagnostic configuration each of the diagnostic fittings are statically coupled proximate corners of the fenestration assembly.

Example 19 can include, or can optionally be combined with the subject matter of Examples 1-18 to optionally include wherein each of the diagnostic fittings include at least one bracket leg configured to statically couple the diagnostic fitting with the fenestration assembly.

Example 20 can include, or can optionally be combined with the subject matter of Examples 1-19 to optionally include wherein each of the diagnostic fittings include a clutching interface configured for locking reception with an accessory kerf of the fenestration assembly.

Example 21 can include, or can optionally be combined with the subject matter of Examples 1-20 to optionally include wherein in the diagnostic configuration at least one of the diagnostic fittings is statically coupled above the diagnostic intersection, and a plumb bob is suspended from the diagnostic fitting and extends through the diagnostic intersection.

Example 22 can include, or can optionally be combined with the subject matter of Examples 1-21 to optionally include wherein the diagnostic cord includes the plumb bob.

Example 23 can include, or can optionally be combined with the subject matter of Examples 1-22 to optionally include wherein in the diagnostic configuration the diagnostic cord is routed between the diagnostic fittings with one or more of the alignment interface or the cord guide of each of the diagnostic fittings.

Example 24 can include, or can optionally be combined with the subject matter of Examples 1-23 to optionally include a method for diagnosing a fenestration assembly installation comprising: statically coupling a plurality of diagnostic fittings at specified locations along a fenestration assembly; routing a diagnostic cord between the plurality of diagnostic fittings, routing includes: aligning at least two lengths of the diagnostic cord at a diagnostic intersection with alignment interfaces of diagnostic fittings of the plurality of diagnostic fittings, and drawing the at least the two lengths of the diagnostic cord taut across the diagnostic intersection; and assessing the installation of the fenestration assembly according to an examination of the diagnostic cord at the diagnostic intersection.

Example 25 can include, or can optionally be combined with the subject matter of Examples 1-24 to optionally include wherein assessing the installation includes determining the fenestration assembly is true: if there is no gap between the lengths of the diagnostic cord at the diagnostic intersection, and if there is no engagement and folding of the diagnostic cords at the diagnostic intersection.

Example 26 can include, or can optionally be combined with the subject matter of Examples 1-25 to optionally include wherein routing the diagnostic cord includes suspending a plumb length of the diagnostic cord from a diagnostic fitting of the plurality of diagnostic fittings with a plumb bob, the diagnostic cord suspended across the diagnostic intersection.

Example 27 can include, or can optionally be combined with the subject matter of Examples 1-26 to optionally include wherein assessing the installation includes determining the fenestration assembly is plumb: if there is no depth gap between the plumb length and the lengths of the diagnostic cord at the diagnostic intersection, and if there is no engagement and folding of the plumb length at the diagnostic intersection.

Example 28 can include, or can optionally be combined with the subject matter of Examples 1-27 to optionally include wherein assessing the installation includes determining the fenestration is square and level: if the plumb length is aligned with the lengths of the diagnostic cord at the diagnostic intersection.

Example 29 can include, or can optionally be combined with the subject matter of Examples 1-28 to optionally include wherein statically coupling the plurality of diagnostic fittings at specified locations includes coupling one or more bracket legs of each of the diagnostic fittings with a fenestration frame of the fenestration assembly.

Example 30 can include, or can optionally be combined with the subject matter of Examples 1-29 to optionally include wherein statically coupling the plurality of diagnostic fittings at specified locations includes coupling clutching interfaces of each of the diagnostic fittings with an accessory kerf of the fenestration assembly.

Example 31 can include, or can optionally be combined with the subject matter of Examples 1-30 to optionally include wherein aligning the at least two lengths of the diagnostic cord at the diagnostic intersection includes passing the diagnostic cord through alignment recesses of the alignment interfaces.

Example 32 can include, or can optionally be combined with the subject matter of Examples 1-31 to optionally include wherein routing the diagnostic cord between the plurality of diagnostic fittings includes winding the diagnostic cord along cord guides of the plurality of diagnostic fittings.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the disclosure can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the disclosure should be determined with reference to the appended claims, along with the full scope of equivalents to which such claims are entitled.

What is claimed is:

1. A fenestration installation diagnostic system comprising:
    a diagnostic cord;
    a plurality of diagnostic fittings configured for coupling with a fenestration assembly, each of the diagnostic fittings includes:
        at least one bracket leg configured to statically couple the diagnostic fitting with fenestration assembly;
        at least one alignment interface configured to receive the diagnostic cord and align the diagnostic cord at a diagnostic intersection; and
        at least one cord guide configured to route the diagnostic cord along the diagnostic fitting and toward another diagnostic fitting of the plurality of diagnostic fittings; and
    wherein the plurality of diagnostic fittings includes a first diagnostic fitting configured to statically couple with the fenestration assembly above the diagnostic intersection and route a plumb length of the diagnostic cord through the diagnostic intersection.

2. The system of claim 1, wherein the diagnostic cord includes a plumb bob proximate an end of the diagnostic cord.

3. The system of claim 1, wherein one or more of the diagnostic fittings of the plurality of diagnostic fittings includes:
    a locking bracket having the at least one bracket leg, and
    a diagnostic block coupled with the locking bracket, the diagnostic block having the at least one alignment interface and the at least one cord guide.

4. The system of claim 3, wherein the diagnostic block and the locking bracket are integral or separate components.

5. The system of claim 1, wherein the at least one bracket leg includes at least two bracket legs, and at least one of the two bracket legs includes a clutching interface configured for locking reception within an accessory kerf of the fenestration assembly.

6. The system of claim 5, wherein the clutching interface includes a flange extending at an angle relative to a remainder of the bracket.

7. The system of claim 5, wherein the diagnostic fitting includes a fitting leg extending along the clutching interface with a kerf gap therebetween, and the fitting leg and the clutching interface cooperate to receive a kerf edge of the fenestration assembly therein.

8. The system of claim 1, wherein the at least one alignment interface includes at least first and second alignment interfaces having respective first and second alignment recesses, and the first alignment interface including the first alignment recess extends at a first angle,
the second alignment interface including the second alignment recess extends at a second angle, and
a cord recess is between the first and second alignment interfaces, and the cord recess and at least one of the first and second alignment recesses cooperate to align the diagnostic cord at the diagnostic intersection.

9. The system of claim 8, wherein the first and second alignment interfaces include surfaces that taper toward the cord recess.

10. The system of claim 1, wherein the at least one alignment interface includes first and second alignment recesses,
the first alignment recess is proximate a fitting interior of the diagnostic fitting, and
the second alignment recess is proximate a fitting exterior of the diagnostic fitting.

11. The system of claim 1, wherein the at least one alignment interface includes one or more of a groove, ridge, furrow, recess, a fork or a post.

12. The system of claim 1 comprising the fenestration assembly.

13. The system of claim 12, wherein in a diagnostic configuration each of the diagnostic fittings is statically coupled at respective specified locations along the fenestration assembly, and the diagnostic cord is routed between each of the diagnostic fittings along the respective at least one alignment interfaces, and
in the diagnostic configuration the diagnostic cord aligned by the at least one alignment interfaces extends to the diagnostic intersection.

14. The system of claim 13, wherein the intersection of the diagnostic cord at the diagnostic intersection is configured to assess one or more installation characteristics of the fenestration assembly including level, plumb, square, jamb bow or true.

15. The system of claim 1, wherein the diagnostic cord and the plurality of diagnostic fittings are included in a kit.

16. A fenestration installation diagnostic system comprising:
a plurality of diagnostic fittings configured for static coupling along a fenestration assembly, each of the diagnostic fittings includes:
at least one alignment interface; and
at least one cord guide;
a diagnostic cord; and
wherein the plurality of diagnostic fittings and the diagnostic cord are configured for coupling with the fenestration assembly in a diagnostic configuration including:
each of the diagnostic fittings statically coupled at specified locations of the fenestration assembly, and the diagnostic cord tautly extending from the respective alignment interfaces of the plurality of diagnostic fittings to a diagnostic intersection; and
wherein the plurality of diagnostic fittings includes a first diagnostic fitting configured to statically couple with the fenestration assembly at one of the specified locations above the diagnostic intersection, and wherein the first diagnostic fitting is configured to route a plumb length of the diagnostic cord through the diagnostic intersection.

17. The system of claim 16 comprising the fenestration assembly.

18. The system of claim 16, wherein in the diagnostic configuration each of the diagnostic fittings are statically coupled proximate corners of the fenestration assembly.

19. The system of claim 16, wherein each of the diagnostic fittings include at least one bracket leg configured to statically couple the diagnostic fitting with the fenestration assembly.

20. The system of claim 16, wherein each of the diagnostic fittings include a clutching interface configured for locking reception with an accessory kerf of the fenestration assembly.

21. The system of claim 16, further comprising a plumb bob configured to suspend from the first diagnostic fitting.

22. The system of claim 16, wherein:
the plurality of diagnostic fittings includes a second fitting and a third diagnostic fitting; and
in the diagnostic configuration, the first fitting is located between the first fitting and the second fitting.

23. The system of claim 16, wherein in the diagnostic configuration the diagnostic cord is routed between the diagnostic fittings with one or more of the alignment interface or the cord guide of each of the diagnostic fittings.

24. A method for diagnosing a fenestration assembly installation comprising:
statically coupling a plurality of diagnostic fittings at specified locations along a fenestration assembly, including statically coupling a first diagnostic fitting of the plurality of diagnostic fittings to the fenestration assembly at a first location of the specified locations;
routing a diagnostic cord between the plurality of diagnostic fittings, routing includes:
aligning at least two lengths of the diagnostic cord at a diagnostic intersection with alignment interfaces of diagnostic fittings of the plurality of diagnostic fittings;
drawing the at least the two lengths of the diagnostic cord taut across the diagnostic intersection;
routing a plumb length of the diagnostic cord from the first diagnostic fitting, wherein:
the first location of the first diagnostic fitting is located above the diagnostic intersection; and
the plumb length extends across the diagnostic intersection; and
assessing the installation of the fenestration assembly according to an examination of the diagnostic cord at the diagnostic intersection.

25. The method of claim 24, wherein assessing the installation includes determining the fenestration assembly is true:
if there is no gap between the lengths of the diagnostic cord at the diagnostic intersection, and
if there is no engagement and folding of the diagnostic cords at the diagnostic intersection.

26. The method of claim 24, wherein routing the diagnostic cord includes suspending a plumb length of the diagnostic cord from a diagnostic fitting of the plurality of diagnostic fittings with a plumb bob, the diagnostic cord suspended across the diagnostic intersection.

27. The method of claim 26, wherein assessing the installation includes determining the fenestration assembly is plumb:
if there is no depth gap between the plumb length and the lengths of the diagnostic cord at the diagnostic intersection, and
if there is no engagement and folding of the plumb length at the diagnostic intersection.

28. The method of claim 26, wherein assessing the installation includes determining the fenestration is square and level:
   if the plumb length is aligned with the lengths of the diagnostic cord at the diagnostic intersection.

29. The method of claim 24, wherein statically coupling the plurality of diagnostic fittings at specified locations includes coupling one or more bracket legs of each of the diagnostic fittings with a fenestration frame of the fenestration assembly.

30. The method of claim 29, wherein statically coupling the plurality of diagnostic fittings at specified locations includes coupling clutching interfaces of each of the diagnostic fittings with an accessory kerf of the fenestration assembly.

31. The method of claim 24, wherein aligning the at least two lengths of the diagnostic cord at the diagnostic intersection includes passing the diagnostic cord through alignment recesses of the alignment interfaces.

32. The method of claim 24, wherein routing the diagnostic cord between the plurality of diagnostic fittings includes winding the diagnostic cord along cord guides of the plurality of diagnostic fittings.

* * * * *